(12) United States Patent
White

(10) Patent No.: US 10,256,624 B2
(45) Date of Patent: Apr. 9, 2019

(54) INRUSH CURRENT LIMITER

(71) Applicant: KeyMed (Medical & Industrial Equipment) Limited, Southend-on-Sea Essex (GB)

(72) Inventor: William John White, Hockley (GB)

(73) Assignee: KeyMed (Medical & Industrial Equipment) Limited, Southend-on-Sea, Essex (GB)

( * ) Notice: Subject to any disclaimer, the term of this patent is extended or adjusted under 35 U.S.C. 154(b) by 409 days.

(21) Appl. No.: 15/039,257

(22) PCT Filed: Nov. 25, 2014

(86) PCT No.: PCT/GB2014/053491
§ 371 (c)(1),
(2) Date: May 25, 2016

(87) PCT Pub. No.: WO2015/079220
PCT Pub. Date: Jun. 4, 2015

(65) Prior Publication Data
US 2017/0141565 A1  May 18, 2017

(30) Foreign Application Priority Data

Nov. 26, 2013  (GB) .................................. 1320839.2

(51) Int. Cl.
*H02H 9/00* (2006.01)
*H02H 9/02* (2006.01)
(52) U.S. Cl.
CPC .............. *H02H 9/02* (2013.01); *H02H 9/001* (2013.01); *H02H 9/026* (2013.01)
(58) Field of Classification Search
CPC ..................................................... H02H 9/02
See application file for complete search history.

(56) References Cited

U.S. PATENT DOCUMENTS

| 4,328,459 A | 5/1982 | McLeod, Jr. |
| 5,087,871 A | 2/1992 | Losel |

(Continued)

FOREIGN PATENT DOCUMENTS

| CN | 201533158 U | 7/2010 |
| CN | 201766353 U | 3/2011 |

(Continued)

OTHER PUBLICATIONS

State Intellectual Property Office of China, Search Report in Chinese Patent Application No. 2014870071913.0, dated Nov. 28, 2017, 4 pp.

(Continued)

*Primary Examiner* — Stephen W Jackson
(74) *Attorney, Agent, or Firm* — Leydig, Voit & Mayer, Ltd.

(57) ABSTRACT

A device for limiting the inrush current component of a current provided by a supply to a load, the device including an impedance arranged between the supply and the load, a switch arranged to divert the current from the impedance, an inrush period timer connected to the supply and arranged to activate the switch after expiry of an inrush time period, the inrush time period being a time period beginning upon the supply becoming active such that current is available to be provided by the supply to the load and a reset circuit connected to the supply and the inrush period timer, the reset circuit arranged to deactivate the switch and reset the inrush period timer in response to the supply becoming inactive such that no current is available to be provided by the supply to the load.

15 Claims, 14 Drawing Sheets

(56) References Cited

U.S. PATENT DOCUMENTS

| | | | |
|---|---|---|---|
| 5,179,842 A | | 1/1993 | Kanazawa |
| 5,811,939 A | * | 9/1998 | Herniak ................ H05B 41/40 |
| | | | 307/113 |
| 6,204,751 B1 | | 3/2001 | Bolda et al. |
| 8,582,262 B2 | | 11/2013 | Divan |
| 2005/0231874 A1 | | 10/2005 | Hussein et al. |
| 2011/0214001 A1 | | 9/2011 | Liu |
| 2015/0308397 A1 | * | 10/2015 | Hirabayashi ............ H02P 7/06 |
| | | | 290/38 C |

FOREIGN PATENT DOCUMENTS

| | | |
|---|---|---|
| GB | 2478597 A | 9/2011 |
| JP | 2009-060722 A | 3/2009 |
| WO | WO 98/52267 A1 | 11/1998 |

OTHER PUBLICATIONS

United Kingdom Intellectual Property Office, Search Report in United Kingdom Patent Application No. GB1320839.2, dated Feb. 6, 2014, 2 pp.

European Patent Office, International Search Report in International Patent Application No. PCT/GB2014/053491, dated Feb. 9, 2015, 4 pp.

European Patent Office, Written Opinion in International Patent Application No. PCT/GB2014/053491, dated Jun. 4, 2015, 6 pp.

* cited by examiner

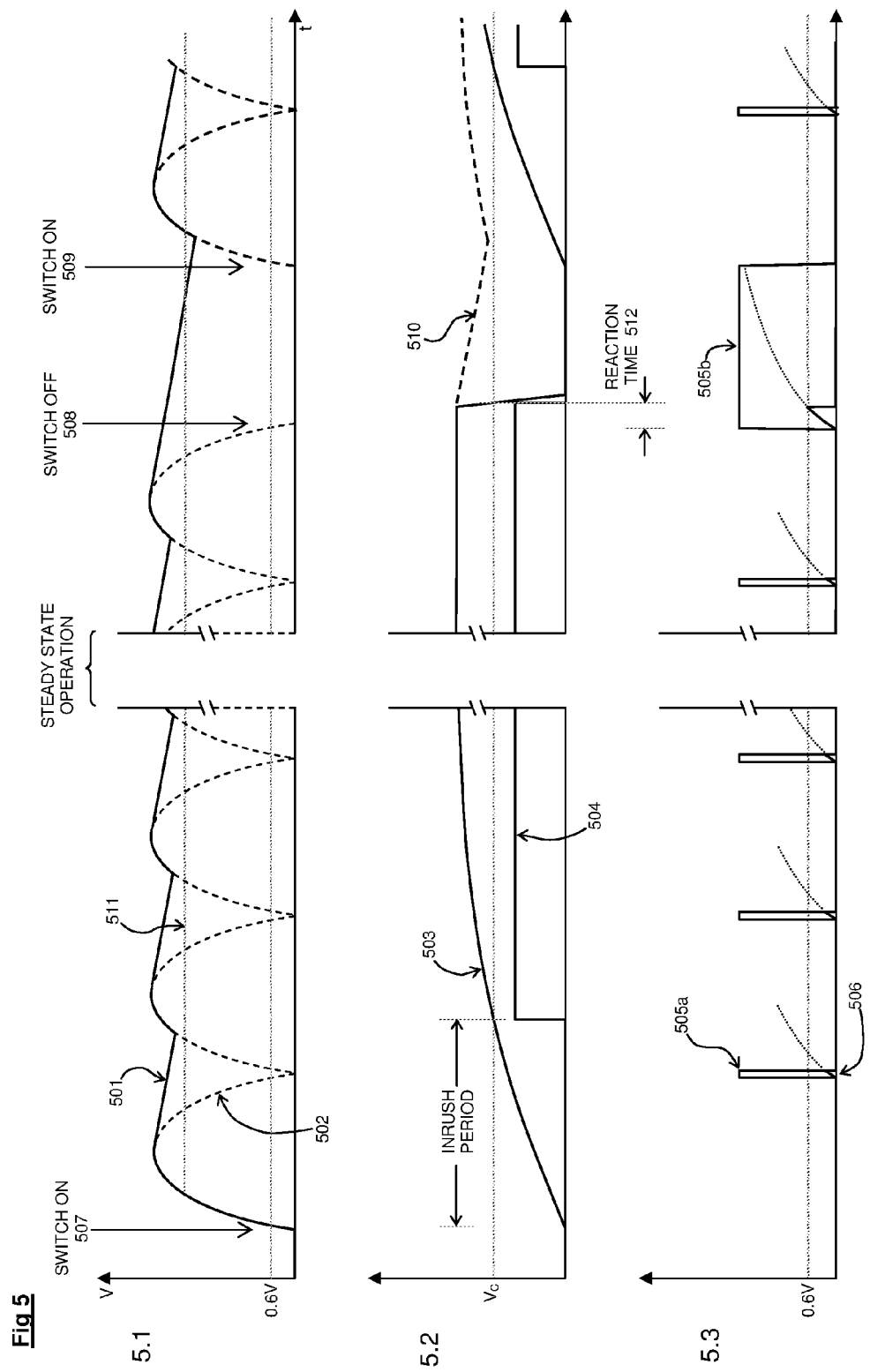

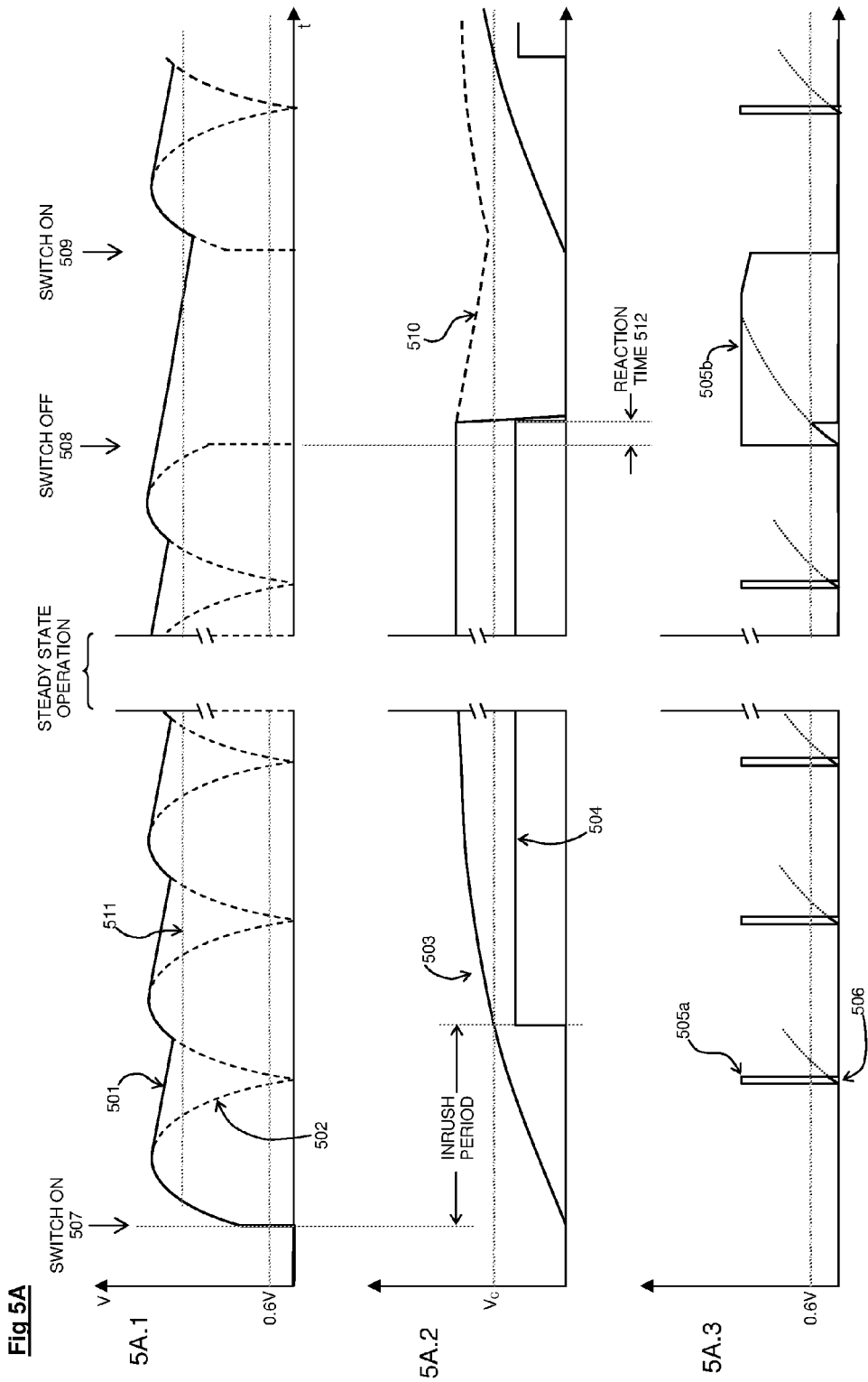

INRUSH CURRENT LIMITER

CROSS-REFERENCE TO RELATED APPLICATIONS

This application is a national phase application of International Patent Application No. PCT/GB2014/053491, filed Nov. 25, 2014, which claims priority to Great Britain Patent Application No. GB1320839.2, filed Nov. 26, 2013, both of which are incorporated by reference herein in their entireties for all purposes.

The present invention relates to a device for protection from inrush current following momentary drop-outs of a power supply. Such a device may be useful in electronic medical equipment where spontaneous tripping of the mains supply that results from an inrush current is particularly undesirable.

BACKGROUND

When a power supply connected to an electronic device is turned on, an initial current is provided by the power supply to the electronic device. This initial current may come in a surge that is much larger than the current which flows in a steady-state operation of said device. Such a surge of current is known as an inrush current, and may lead to a tripping of a protection device supporting the electronic device or permanent damage to electronic components of the electronic device.

Inrush current to electronic devices can be limited by providing a resistive component between the power supply and the electronic device. An example of such a component is a negative temperature co-efficient (NTC) thermistor. The resistance of a NTC thermistor decreases as the temperature of the NTC thermistor is raised. By providing one or more NTC thermistors in series between the current supply and the electronic device, a resistance is provided to reduce the current flowing into the electronic device. When the device is first switched on, the NTC thermistors are 'cold' and thus impede the inrush current and limit the effect of said inrush current on the electronic device. This resistance will significantly reduce as the NTC thermistors are heated by the current flowing through them, thus providing limited resistance to the final, steady-state current flowing to the device.

A disadvantage of employing NTC thermistors as a means for inrush current protection is that, after the current flowing through them is removed, the NTC thermistors remain 'warm' with a low resistance. Thus if the current is turned off and then on again before the NTC thermistors have been able to cool to a high resistance state, there will be limited or no protection provided to protect against any inrush current associated with this turn on. Sometimes the current surge will be modest or absent, in which case the equipment will continue as if nothing has happened, but on occasion the surge will be very large and may cause a protection device to trip.

One solution to this problem is to divert the supply of current away from the NTC thermistors following a period immediately after switch on of the power supply in which the inrush current occurs (the inrush period). The NTC thermistors, with no current flowing through them, are then able to cool down in preparation for a subsequent switch on and resultant inrush current surge. For example, a timing circuit may be provided that engages a switch that short circuits the NTC thermistors after a preset time period. Once the supply is turned off, the timing circuit loses power and subsequently the switch is reset, allowing for inrush current protection for a subsequent turn on of the power supply.

However, in such a circuit the switch of such a timing circuit is not disengaged immediately upon turning off of the supply. This is a consequence of residual charge retained within the circuit (for example in capacitors employed in the timing circuitry or in reservoir capacitors employed to smooth the input voltage of the timing circuit), which takes time to discharge. Thus the components within the timing circuit are still subject to a driving potential during this decay period, including the switch. The switch will therefore disconnect after a time dependent on the decay of the residual charge contained in the circuit. Thus following the turn off of the supply, there is a short time period before the switch resets. While the switch reset time period is significantly shorter than the cool-down time of the NTC thermistors, this can still be problematic if there is a reconnection of the power supply within this period. This is because while the NTC thermistors may be in a 'cold', high resistance state, they are still short-circuited and therefore not arranged to limit any inrush current. Thus in this short time period the circuitry is vulnerable to inrush currents.

A large surge of inrush current may occur, for example, in devices including a separation transformer, where momentary interruptions cause the transformer to drop out and then power up again, causing the core of the transformer to become saturated as the supply is reconnected. In a similar situation, large inrush currents may occur if the mains plug is plugged into the device but the connection is not cleanly made, i.e. there are a series of momentary connections, with each one causing the thermistors to heat up and reducing their effectiveness. If the protection device were to trip under these conditions, it may not be able to reset until some time afterwards, when the thermistors have cooled down.

Consequently, there is a need to provide for inrush current protection in the event of brief interruptions of the power supply.

SUMMARY OF THE INVENTION

According to the present invention, there is described a device for limiting the inrush current component of a current provided by a supply to a load, the device comprising an impedance arranged between the supply and the load, a switch arranged to divert current from the impedance, an inrush period timer connected to the supply and arranged to activate the switch after expiry of the inrush time period, the inrush time period being a time period beginning upon the supply becoming active such that current is available to be provided by the supply to the load and a reset circuit connected to the supply and the inrush period timer, the reset circuit arranged to reset the inrush period timer and so deactivate the switch in response to the supply becoming inactive such that current is not available to be provided by the supply to the load. Within the description below, reference is made to a 'turn on' or 'turn off' of the supply, but it is to be understood that the meaning of these terms is not restricted to an active turn on or turn off, such as intervention of a user. These terms are also understood to mean other cessation and resumption events of the supply such as during temporary 'drop outs'. Therefore a 'turn on' of the supply is understood to mean the supply becoming active such that current is available to be provided by the supply to the load, and a 'turn off' of the supply is understood to mean the supply becoming inactive such that current is not available to be provided by the supply to the load.

In an advantageous embodiment, the impedance is a negative temperature coefficient (NTC) thermistor. An NTC thermistor is well suited for inrush current protection as it provides greatest resistance at the start of an inrush event, when the current itself is greatest.

The present invention addresses the problem of how to provide inrush current protection following reconnection of a power supply during a period after the supply has been disconnected, but before the inrush current protection circuit has reset. Without the inrush timer being reset by a separate reset circuit, the time taken for inrush current protection to be reinstated is the time it takes for the decay of charge retained in the electronic components of the inrush timer, such as in a reservoir capacitor. By implementing a separate reset circuit, the switch is deactivated as soon as a turn off event occurs, significantly reducing the period in which the system is vulnerable to inrush current.

In a further advantageous embodiment the reset circuit is arranged to deactivate the switch by resetting the inrush period timer. This may be achieved, for example, by shorting out a timing capacitor of the inrush period timer, thus simplifying the construction of the circuit.

In a further advantageous embodiment, the reset circuit further comprises a low voltage detector to generate a reset pulse at an output upon identification of a voltage below a predefined threshold and a reset pulse filter connected to the output of the low voltage detector, the reset pulse filter arranged to trigger a reset of the inrush period timer when the reset pulse is of a given duration. The low voltage detector and reset pulse filter assembly operate to distinguish between a genuine 'off' event and an event of merely low voltage such as a zero-crossing event. Thus, a reset of the inrush period timer is triggered only in response to a true disconnect of the supply. In a further advantageous embodiment, the reset circuit comprises an RC network.

In a further advantageous embodiment, the reset circuit incorporates a trigger suppressor in the form of a feedback network, wherein the trigger suppressor is connected to the inrush period timer and is arranged to prevent generation of reset pulses during an active period, being the period from the turn on of the supply until the expiration of the inrush time period. During inrush current protection, the potential drop across the impedance may result in a disadvantageous change to the power supply voltage supplied to the inrush timing circuit, which may result in a premature and unwanted reset of the inrush period timer. The feedback network prevents this unwanted reset.

In a further advantageous embodiment, the activation of the switch is derived from the output of a comparator, the comparator arranged to compare the voltage on the timing capacitor of the inrush period timer against a reference voltage. A comparator has an output dependent on reference and input values, which can be modified to provide precise switching in specific embodiments.

In a further advantageous embodiment, the comparator of the inrush period timer is arranged to change the comparator reference value after the switch has been activated. For example, the comparator may incorporate a feedback diode to introduce hysteresis. The switch is to be activated once the inrush period is over, but a recrossing of the comparator values may occur to retrigger the switch unnecessarily; once the comparator output switches, the feedback diode will change the reference value for the comparator to prevent this recrossing.

In another advantageous embodiment, the device further comprises an output switch arranged to control the current provided to the load, and an output disable timer connected to the supply, the output disable timer arranged to activate the output switch after expiry of an output disable period, the output disable period being a time period beginning upon the supply becoming active such that current is available to be provided by the supply to the load. The output disable period is of duration such that the output switch is not active while the inrush limiting circuit is active. Having the output connected during the inrush period may lead to increased current through the impedance, causing accelerated heating. Disabling the output during a time period following switch on decreases this current and consequent thermistor heating. In an advantageous embodiment, the output disable period is arranged to start upon activation of the supply following a sustained period of inactivity such as upon a first turn-on of the supply.

In a further advantageous embodiment, the device comprises a manually operated switch such that the output control relay (and therefore the output switch) may also be controlled by an external manually-operated switch, connected to the device by a cable or other means, so enabling the user to manually turn the power to the load on or off as required.

In an advantageous embodiment, the reset circuit does not reset the output disable timer. Because the inrush timer is designed to reset very quickly, it is preferable to keep the output switch separate from the inrush period timer, as it is desirable to have the output be capable of 'riding out' momentary interruptions.

In accordance with the present invention, there is provided a method for limiting the inrush current component of a current provided between a supply and a load, the method comprising providing an impedance between the supply and the load to create a resistance against the inrush current; starting an inrush period timer in response to the supply becoming active such that current is available to be provided by the supply to the load; after expiration of an inrush time period, the inrush time period being a time period following the start of the inrush period timer, activating a switch to divert the current from the impedance; deactivating the switch and resetting the inrush period timer in response to the supply becoming inactive such that no current is available to be provided by the supply to the load.

In a further advantageous embodiment, the method further comprises using a low voltage detector to generate a reset pulse upon identification of a voltage below a predefined threshold; and using a reset pulse filter to filter out reset pulses of a duration below a minimum reset pulse duration to identify a reset pulse that is able to cause deactivation of the switch in response to the supply becoming inactive.

In another advantageous embodiment, the method further comprises starting an output disable timer to divert current from the load for the approximate duration of the inrush period timer in response to the supply becoming active such that current is available to be provided by the supply to the load. In an advantageous embodiment, the output disable timer is started in response to the supply becoming active following a sustained period of inactivity, such as upon a first turn-on of the supply. This prevents only momentary dropouts affecting supply of current to the load.

In another advantageous embodiment, the output disable timer is not actively reset in response to a turn off of the supply.

In another advantageous embodiment, the method further comprises setting the duration of the output disable timer based on the inrush time period.

Other preferred features and advantages of the invention are set out in the description and in the dependent claims which are appended hereto.

BRIEF DESCRIPTION OF THE DRAWINGS

Embodiments of the invention will now be described by way of example with reference to the accompanying drawings in which:

FIG. 5 illustrates the time dependent operation of the inrush current protection circuit of the present invention;

FIG. 5A illustrates another time dependent operation of the inrush current protection circuit of the present invention;

DETAILED DESCRIPTION

Preferred embodiments of the present invention are now provided with reference to the accompanying figures.

Figure 1:
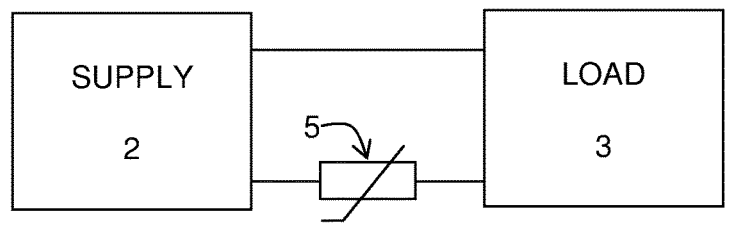
FIG. 1 shows a schematic for a prior art device with basic inrush current protection.

FIG. 1 shows a basic circuit to provide inrush current protection, well understood by those skilled in the art. A supply 2 is connected to a load 3. Arranged between the supply 2 and the load 3 is an impedance 5, where the impedance 5 may be a resistor, but is preferably a Negative Temperature Coefficient (NTC) thermistor. Hereafter reference will be made to an NTC thermistor, but it is to be understood that alternative impedances may be used. The arrangement of the NTC thermistor 5 between the supply 2 and the load 3 provides a high resistance to currents in a period immediately following an initial turn on of the supply, and low resistance during steady-state operation. Following turn off of the supply 2, the NTC thermistor 5 remains in a 'warm', low-resistance state during a period in which it cools to a high-resistance state. Therefore a vulnerable period, a period in which limited to no inrush current protection is provided, follows the turn off of the power supply. In this case, the vulnerable period is the cooling time of the NTC thermistor 5.

Figure 2:
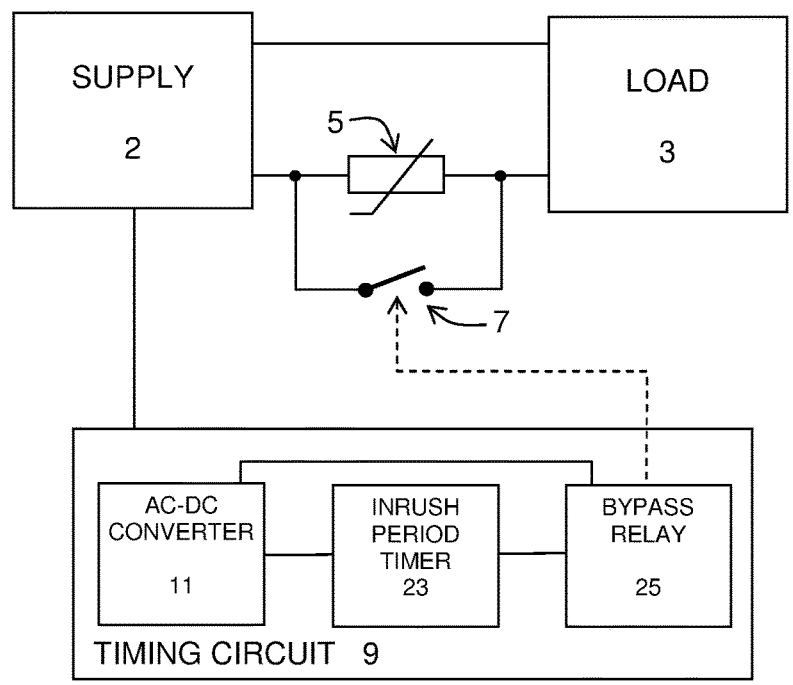
FIG. 2 shows a schematic for a prior art device with resettable inrush current protection.

FIG. 2 shows a schematic illustrating a device to reduce the above identified vulnerable period, such as that implemented, for example, in the Olympus WM-NP2 mobile endoscopic workstation. A supply 2 is connected to a load 3. Connecting the supply 2 and the load 3 is an NTC thermistor 5. Connected across the NTC thermistor 5 is a bypass switch 7, arranged such that closing the switch will short-circuit the NTC thermistor 5 such that current is diverted from the NTC thermistor 5. The supply 2 is also connected to a timing circuit 9. The supply 2 may be connected to the timing circuit 9 directly or, advantageously, by interposition of a separation transformer (not shown) or by means of an auxiliary winding on said separation transformer connecting the supply 2 to the load 3. The timing circuit 9 comprises an AC-DC converter 11, an inrush period timer 23 and a bypass relay 25 where the AC-DC converter 11 is connected to the inrush period timer 23 and the bypass relay 25, and the inrush period timer is connected to the bypass relay 25. The timing circuit 9 is communicatively coupled to the bypass switch 7 by means of the bypass relay 25, whereby engaging and disengaging the bypass relay results in a closure and opening of the bypass switch 7 respectively.

Prior to an initial turn-on of the supply 2, the bypass switch 7 is open and the NTC thermistor 5 is in a high-resistance state. Upon an initial turn-on, the NTC thermistor 5 is arranged between the supply 2 and the load 3 and provides resistance to an inrush current. The initial turn-on of the supply engages the timing circuit 9 by means of the provision of an AC potential to the AC-DC converter 11, which in turn provides a DC potential to the inrush period timer 23 to start the inrush period timer 23. After a period of operation of the timing circuit has elapsed, the inrush period timer engages the bypass relay 25, such as to close the bypass switch 7 across the NTC thermistor 5. The period of operation of the timing circuit from the turn on of the supply until the closing of the switch is referred to as the 'inrush limiting period' and may be a predefined value or a fixed value. The closing of the bypass switch 7 results in a short-circuit of the NTC thermistor 5, diverting current from the NTC thermistor 5. Thus, the supply continues to provide current to the load 3 in a steady-state operation but the diversion of current from the NTC thermistor 5 allows the NTC thermistor 5 to cool in preparation for a subsequent turn-on of the supply 2.

However, when the circuit is arranged such that the bypass switch 7 is closed, the NTC thermistor 5 is short circuited and is no longer arranged to provide inrush current protection. The bypass switch 7 is controlled by engaging and disengaging the bypass relay 25 and thus inrush current protection cannot be in place until the bypass relay 25 controlling the switch is disengaged and the bypass switch 7 is opened. The bypass relay 25 will not immediately disengage following a turn off of the supply, because while the supply 2 will cease to provide an output, the AC-DC converter 11 will continue to provide a current after the supply is switched off because of charge retained in the AC-DC converter 11 (e.g. in one or more reservoir capacitors, used for smoothing of a DC voltage). Thus the potential provided to the bypass relay 25 by means of the inrush period timer 23 will decay as the charge in the AC-DC converter 11 decays and the bypass relay 25 will not drop out until a period of time has elapsed, the period of time dependent on the hold-up time of electronic components such as a reservoir capacitor. If the device is turned off and turned on again before this time period has elapsed and before the bypass relay has disengaged, there will be no inrush current protection available. The device of FIG. 2 therefore still has a vulnerable period, corresponding to the drop-out time of the bypass relay 25.

Figure 3:
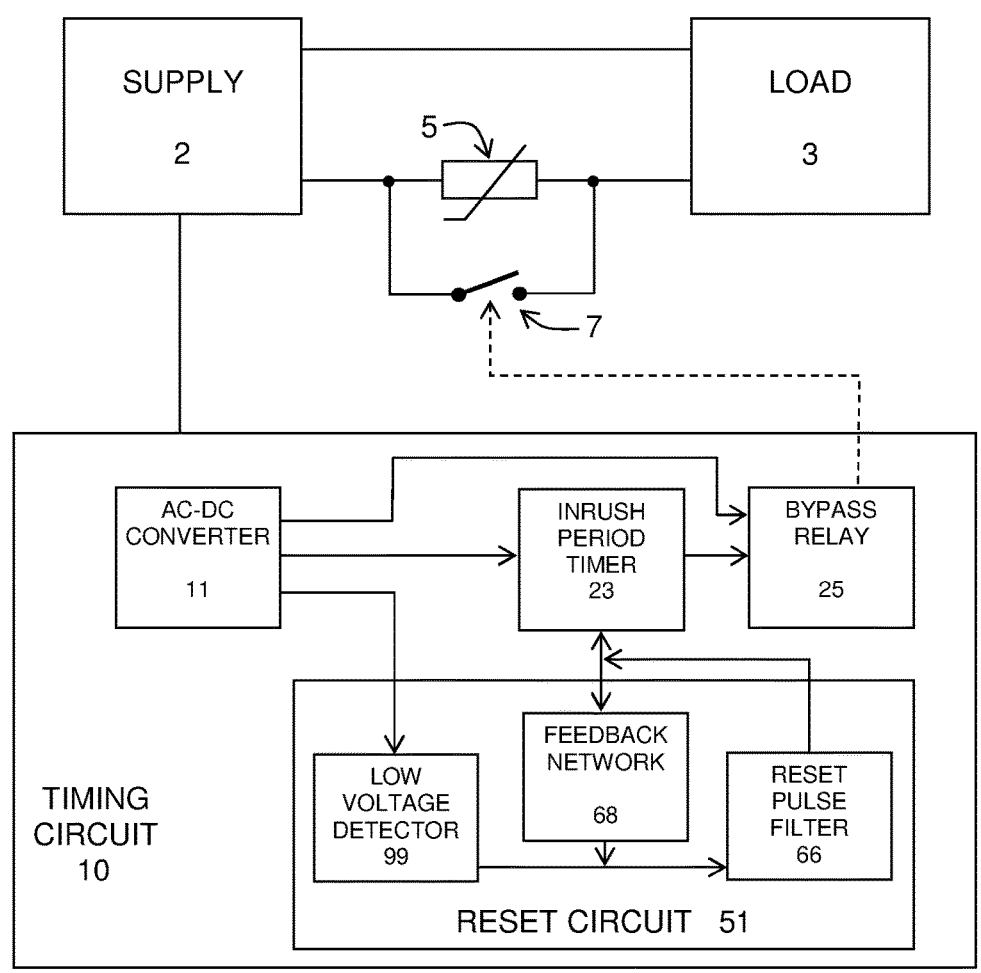
FIG. 3 shows a schematic for the inrush current protection of the present invention.

FIG. 3 shows a schematic for a device 1 for limiting the inrush current component of a current provided by a supply 2 to a load 3 according to a preferred embodiment of the present invention. The device is implemented to provide a means to allow for the bypass relay 25 and inrush period timer 23 to reset quickly in readiness for a new start. The device 1 with inrush current protection comprises a supply 2 connected to a load 3. The supply 2 may be connected directly or, advantageously, by means of a separation transformer (not shown). Arranged between the supply 2 and the load 3 is an impedance, the impedance preferably being an NTC thermistor 5. The device 1 further comprises a bypass switch 7 arranged to divert the current from the impedance. The bypass switch 7 is connected across the NTC thermistor 5 and is arranged such that closing the bypass switch 7 will short-circuit the NTC thermistor. The device further comprises a timing circuit 10 arranged to control the bypass switch 7, where the timing circuit 10 is connected to the supply 2. The supply 2 may be connected to the timing circuit 10 directly or, advantageously, by means of a separation transformer (not shown) or by means of an auxiliary winding on a separation transformer connecting the supply 2 to the load 3. The timing circuit 10 comprises an AC-DC converter 11, an inrush period timer 23, a reset circuit 51 and a bypass relay 25. The timing circuit 10 is communicatively coupled to the bypass switch 7 by means of the bypass relay 25, whereby engaging and disengaging the bypass relay results in a closure and opening of the bypass switch 7. The inrush period timer 23 is connected to the supply 2 by means of connection to the AC-DC converter 11 and the bypass relay 25. The reset circuit 51 is connected to the supply 2, by means of connection to the AC-DC converter 11, and to the inrush period timer 23. The reset circuit is arranged to deactivate the bypass switch 7 and reset the inrush period timer 23 in response to a turn off of the supply.

In a further advantageous embodiment, the reset circuit 51 may comprise a low voltage detector 99 and a reset pulse filter 66. The low voltage detector is connected to the supply 2 by means of a connection to the AC-DC converter 11, and the reset circuit 51 is connected to the supply 2 by means of a connection to the low voltage detector 99. In another further advantageous embodiment, the reset circuit 51 may incorporate a trigger suppressor in the form of a feedback network 68 to counteract spurious operations. The feedback network 68 is connected to the inrush period timer and is arranged to prevent generation of reset pulses until expiration of the inrush limiting period.

In the circuit of FIG. 3, the operation of the AC-DC converter 11, the inrush period timer 23 and the bypass relay 25 are as described above with respect to FIG. 2 (i.e. the inrush period timer 23 is arranged to start in response to a turn on of the supply 2 and after a time period following the turn-on of the supply 2, the inrush period timer 23 closes the bypass switch 7 by means of activating the bypass relay 25 to close the bypass switch 7). In the device of FIG. 3 and in contrast to the device of FIG. 2, once the supply 2 is turned off, the reset circuit 51 operates in response to an observation of this turn-off (an 'OFF event'). The operation of the reset circuit 51 is such as to drop the bypass relay 25, thus significantly reducing the vulnerable period. This drop-out of the bypass relay 25 is achieved by the reset circuit 51 actively resetting the inrush period timer 23 in response to an observation of an OFF event of the power supply. The driving potential across the bypass relay 25 is removed and consequently the bypass relay 25 is disengaged, causing the bypass switch 7 to be deactivated. This is in contrast to the circuit of FIG. 2, where an OFF event is not observed and the bypass relay 25 and the bypass switch 7 are disengaged simply by waiting for residual charge in the inrush period timer 23 to decay. In the advantageous embodiment where the reset circuit 51 comprises a low voltage detector 99 and a reset pulse filter 66, the low voltage detector 99 and reset pulse filter 66 operate to filter occurrences of merely low voltage (e.g. zero-voltage crossings) from those that correspond to a turn-off of the device. The low voltage detector 99 receives an input from the AC-DC converter 11 to identify when an applied voltage falls below a predetermined threshold. Upon observation of a potential below the specified threshold by the low voltage detector 99, the reset circuit 51 generates a reset pulse at an output of the low voltage detector 99. The output of the low voltage detector 99 is provided to the reset pulse filter 66. If the voltage remains below this threshold for a certain time period, the reset pulse will be of sufficient duration for the reset circuit to deactivate the switch and reset the inrush period timer as above, by means of the output of the reset pulse filter 66 causing a reset of the inrush period timer 23. If the voltage does not remain below this threshold for said time period, then the reset circuit 51 will not cause a reset of the inrush period timer 23 to disengage the bypass relay 25. This time period is preferably short enough so as to minimise the reset time of the bypass relay 25 and inrush period timer 23, but not too short as to incorrectly identify switch OFF events. More advantageously, the reset signal path to the inrush period timer 23 may also comprise a feedback network 68 coupled to the reset circuit 51 to suppress re-triggering pulses from the power supply until the end of the inrush protection period, as described in a further embodiment below.

Figure 4:
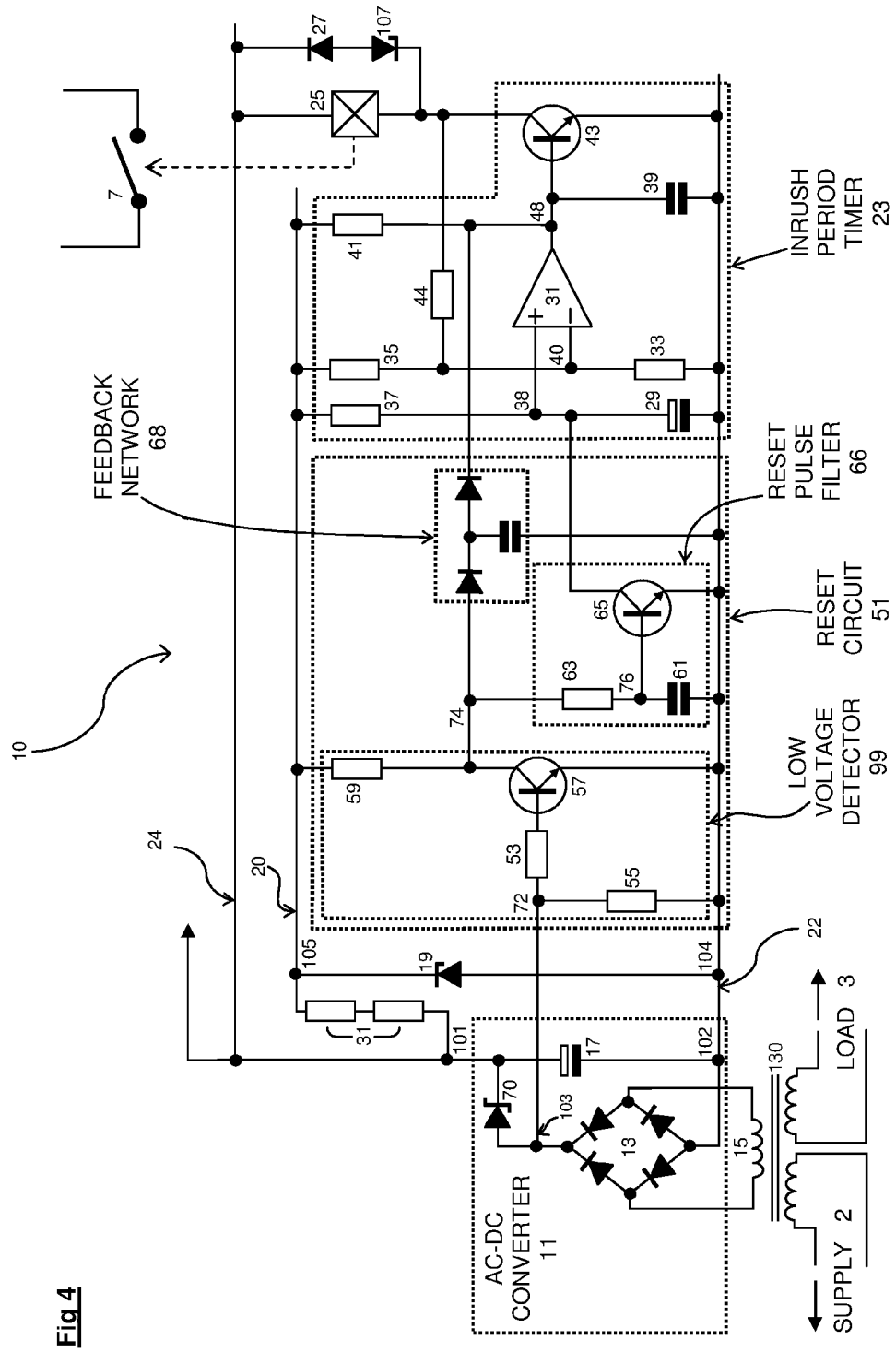
FIG. 4 shows an embodiment of the present invention, in the form of a circuit diagram comprising the inrush period timer and reset circuits.

FIG. 4 shows a circuit diagram for the timing circuit 10 set out in FIG. 3, in accordance with a preferred embodiment of the present invention. The timing circuit 10 comprises an AC-DC converter 11. The input of the AC-DC converter 11 is provided with an alternating current (AC) by means of an auxiliary winding 15 on a transformer 130 connected to a supply 2. In this embodiment, the AC voltage of the auxiliary winding 15 is 12 V, but an alternate potential may be supplied by an appropriate choice of supply and windings. A direct current (DC) is output by the AC-DC converter 11, from an input of the AC provided by the auxiliary winding. The AC-DC converter 11 comprises a bridge rectifier 13, where the positive and negative inputs from the auxiliary winding 15 are connected to the positive and negative inputs of the rectifier 13 respectively. The AC-DC converter 11 also comprises a reservoir/smoothing capacitor 17 arranged such that the anode and cathode of the reservoir capacitor 17 are connected to the positive and negative outputs of the bridge rectifier 13 respectively to stabilise the driving potential at the output of the AC-DC converter 11. Arranged between the anode of the reservoir capacitor 17 and the positive output of the bridge rectifier 13 is a Schottky diode 70 arranged such that the potential at the anode of the reservoir capacitor 17 is the smoothed potential, and at the output of the bridge rectifier is the rectified, unsmoothed potential. The unsmoothed rectified potential at the positive output of the bridge rectifier 13 is provided to the monitoring output 103, and the smoothed potential at the anode of the reservoir capacitor is provided to the positive output 101 of the AC-DC converter 11. The output at the cathode of the reservoir capacitor 17, corresponding to the output at the negative output of the bridge rectifier 13, is provided to the negative output 102 of the AC-DC converter, which is set at zero volts.

A positive rail 24 and a zero-voltage rail 22 are connected to the positive and negative output of the AC-DC converter 11 respectively. A fixed potential rail 20 is connected to the positive rail. A Zener diode 19 connects a node 104 on the zero-voltage rail 22 to a node 105 on the fixed potential rail 20. The Zener diode 19 is arranged in a reverse bias so as to fix the potential difference between the zero-voltage rail 22 and fixed potential rail 20. The example value of the fixed potential difference is given in this embodiment as 10 V, but any potential difference may be fixed by a suitable choice of Zener diode 19. A bleeder resistor 31 is arranged on the fixed potential rail 20 between the AC-DC converter output 101 and the node 105 to mitigate damage to the Zener diode 19.

The timing circuit 10 comprises the AC-DC converter 11, the inrush period timer 23, which is connected to the fixed potential rail 20 and the zero-voltage rail 22, the bypass relay 25 and the reset circuit 51 which is connected to the fixed potential rail 20, the zero-voltage rail 22 and the monitoring output 103. The reset circuit 51 further comprises the low voltage detector 99, connected to the fixed potential rail 20, the zero-voltage rail 22 and the monitoring output 103. The reset circuit 51 is connected to the monitoring output 103 by means of the low voltage detector 99. Connected between the positive rail 24 and the inrush period timer 23 is a bypass relay 25. The bypass relay is arranged to send a signal to the bypass switch 7 upon application of a particular driving potential across the bypass relay 25. Connected across the bypass relay is a diode 27, implemented in reverse bias to suppress the back electromotive force of the relay, and a Zener diode 107 arranged in forward bias to prevent regenerative braking of the armature of the bypass relay 25.

The inrush period timer 23 comprises a timing capacitor 29 and a resistor 37 arranged in series to connect the fixed potential rail 20 to the zero-voltage rail 22 such that the cathode of the timing capacitor 29 is connected to the zero-voltage rail 22. Arranged between the timing capacitor 29 and the resistor 37 is a node 38 connected to the positive (reference) terminal of a comparator 31, such that the comparator is arranged to reference the potential at the node 38. The inrush period timer 23 further comprises a resistor 35 and a resistor 33 arranged in series to connect the fixed potential rail 20 to the zero-voltage rail 22 such that the resistor 33 is directly connected to the zero-voltage rail 22. Arranged between the resistor 35 and the resistor 33 is a node 40 connected to the negative (reference) terminal of the comparator 31, such that the comparator is arranged to reference the potential at node 40. The comparator 31 also derives its own power from the fixed potential rail 20 and the zero-voltage rail 22. The inrush period timer 23 further comprises a resistor 41 and a filter capacitor 39 arranged in series to connect the fixed potential rail 20 to the zero-voltage rail 22 such that the cathode of the filter capacitor is connected to the zero-voltage rail 22. Arranged between the resistor 41 and the capacitor 39 is a node 48. The node 48 is connected to the logic output of the comparator 31 and to the base of an NPN bipolar transistor 43 (although it is to be understood that alternative transistors may be used as appropriate, for example an N-channel MOSFET). The emitter of the transistor 43 is connected to the zero-voltage rail 22. The connection between the inrush period timer 23 and the bypass relay 25 is by means of the connection of the bypass relay 25 to the collector of the transistor 43. In an advantageous embodiment, a resistor 44 connects the collector of transistor 43 to the node 40 to add hysteresis to the comparator 31 added to enable fast, clean switching. Alternatively and beneficially, a diode may replace resistor 44 to produce more pronounced, asymmetric hysteresis.

Figure 4A:
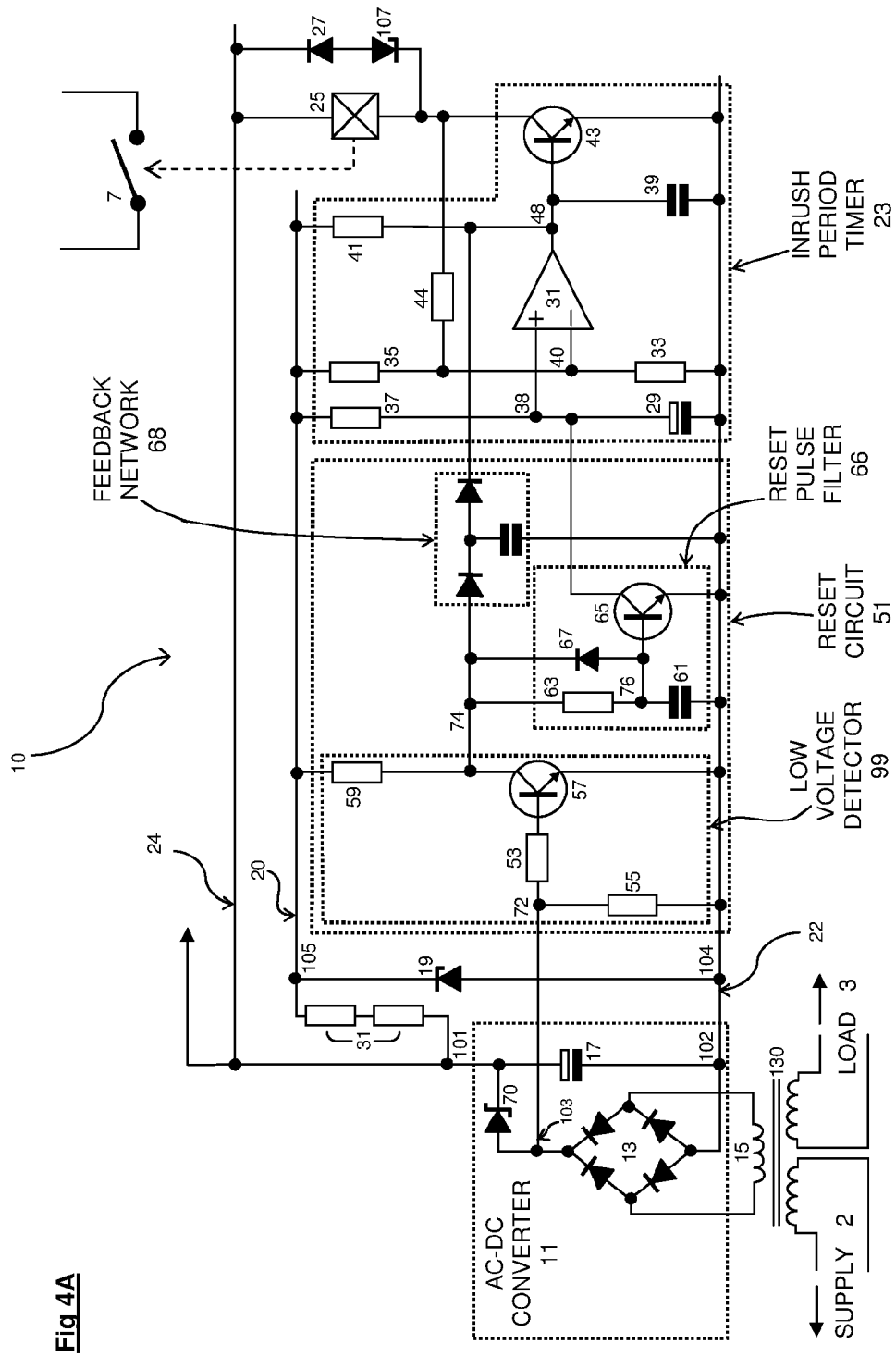
FIG. 4A illustrates the circuit diagram of FIG. 4, where an additional diode component is included in accordance with an advantageous embodiment of the present invention.

The low voltage detector 99 of the reset circuit 51 comprises a node 72 which is connected to the monitoring output 103. The node 72 is further connected to the zero-voltage rail 22 by a resistor 55, and to the base of an NPN bipolar transistor 57 by a resistor 53. A resistor 59 connects the collector of the transistor 57 to the fixed potential rail 20. The emitter of transistor 57 is connected to the zero-voltage rail 22. Arranged between the resistor 59 and the emitter of the transistor 57 is a node 74. A resistor 63 and a capacitor 61 are arranged in series to connect the node 74 to the zero-voltage rail 22 such that the cathode of the capacitor 61 is connected to the zero-voltage rail 22. Arranged between the resistor 63 and the capacitor 61 is a node 76. The node 76 is connected to the base of a transistor 65. The emitter of transistor 65 is connected to the zero-voltage rail 22, and the collector of the transistor 65 is connected to the node 38 of the inrush period timer 23. The resistor 63, capacitor 61 and transistor 65 are in this embodiment the components of the reset pulse filter 66. The reset transistor 65 and the transistor 57 are preferably bipolar transistors, as they allow for switching by slowly increasing voltages close to the 0V rail (as opposed to FETs that might require at least 2V to turn on). Optionally, the reset pulse filter 66 comprises a diode 67 connected in parallel with the resistor 63, with the anode of the diode 67 connected to node 76 and the cathode of the diode 67 connected to node 74. This advantageous embodiment is illustrated in FIG. 4A.

In use, the circuit of FIG. 4 is operable to be responsive to both switch ON events and switch OFF events, to provide inrush current protection both following an initial turn-on of the supply 2 as well as subsequent turn-on events of the supply 2. The auxiliary winding 15 provides an AC voltage to the AC-DC converter 11, which provides a DC voltage output as shown in FIG. 5.1. Prior to an initial switch on event 507, no voltage or current is provided by the AC-DC converter 11. Once the supply has been switched on, the bridge rectifier 13 provides a rectified full-wave output 502. The reservoir capacitor 17 will charge to the maximum voltage of the full-wave rectified output 502. When the full-wave rectified output drops below a maximum value the reservoir capacitor 17 will discharge with a time constant determined by the capacitance of the reservoir capacitor 17 and the overall resistance of the timing circuit 10. The rate of decay of the charge of the reservoir capacitor 17 is preferably as long as practical to reduce the 'ripple voltage' that results from smoothed rectified voltage outputs. The Schottky diode 70 prevents flow of current in the reverse biased direction such that the full-wave rectified output of the bridge rectifier can be preserved and provided to the monitoring output 103. The smoothed, rectified output at the reservoir capacitor 17 is provided to the positive output 101 of the AC-DC converter. The AC-DC converter 11 continues to supply a DC output to the circuit 10 through a steady-state operation of the device until a switch OFF event 508. Following this switch OFF event 508, the output of the bridge rectifier drops to zero and remains at zero until a subsequent switch ON event 509, at which point the bridge rectifier 13 will resume supply of a full-wave rectified potential. The potential 501 at the positive output 101 does not immediately drop to zero, but decays as the charge in the reservoir capacitor decays. This output will recharge to the maximum value when the full-wave rectified supply resumes following the turn ON event 509. The effect of the Zener diode 19 connected between the fixed potential rail 20 and the zero-voltage rail 22 is to maintain the potential 511 of the fixed potential rail 20 to a fixed certain value (e.g. 10 V).

The operation of the inrush period timer 23 is now outlined with reference to FIG. 5.2. Immediately following the switch ON event 507, the timing capacitor 29 will have zero charge and the potential 503, the potential at node 38, will be zero. The timing capacitor will begin to charge at a rate derivable from the time constant, calculated from the capacitance of the timing capacitor 29 and the resistance of the resistor 37. The potential 503 will then begin to increase as the timing capacitor charges. When the potential 503 reaches the comparator reference value $V_C$, which is given by the potential of node 40, the output 504 of the comparator 31 will switch from a zero voltage output to the positive value, derived from the potential at the fixed potential rail 20 and the parameters of the comparator 31. When the output 504 of the comparator 31 switches to the positive value, the potential difference between the base and the collector of the transistor 43 will change, engaging the transistor to allow for a flow of current between the collector and the emitter of the transistor 43. This will in turn provide a driving potential across the bypass relay 25 to engage the bypass relay 25 and consequently close the bypass switch 7.

The filter capacitor 39 and resistor 41 introduce a very short delay to the operation of transistor 43, to avoid any possibility of transistor 43 responding to transient noise spikes that might be impressed upon the normal operating conditions.

The time between the ON event 507 and the closing of the bypass switch 7 is the period in which inrush current protection is provided and is referred to as the 'inrush time period'. It is desirable for an inrush time period to follow every switch ON event of the supply 2. Following the closing of the bypass switch 7, the charge on the timing capacitor 29 continues to increase such that the potential difference across the timing capacitor reaches the potential at the fixed potential rail 20, and remains at this level during steady-state operation of the device. Following the switch OFF event 508, the charge of the timing capacitor 29 will begin to decay as the reservoir capacitor 17 decays, reducing the potential 503 at the positive input of the comparator 31. The comparator output 31 switches back to a zero voltage output once the potential 503 drops below $V_C$, thus disengaging the bypass relay 25 and deactivating the bypass switch 7 in readiness for a subsequent switch ON event 509.

Without the action of the reset circuit 51, which will be outlined below, this deactivation will depend on the hold-up time of the reservoir capacitor 17 as detailed above. With the action of the reset circuit 51, the timing capacitor 29 will discharge rapidly and disengage the bypass relay 25 after the reaction time 512. In the advantageous embodiment where a diode is connected in place of resistor 44, this diode will permit current to flow in a direction from the fixed potential rail to the negative potential rail by means of the resistor 35 and the collector-emitter of the transistor 43. This will cause the potential at node 40, and thus the potential at the negative input of the comparator, to reduce (e.g. from 5 V to 0.5V). This has the effect of reducing the negative input value (the reference value) of the comparator after the positive input to the comparator crosses said negative input value, thus preventing a double triggering from the positive input of the comparator recrossing the reference value.

FIG. 5.3 details the operation of the reset circuit 51. The reset circuit 51 comprises the reset transistor 65 which, when activated, short-circuits the timing capacitor 29 of the inrush period timer 23 so as to disengage the bypass relay 25 and deactivate the bypass switch 7. The arrangement of the inrush timing capacitor 29 and resistor 37 allows for a short circuit to be created by simply connecting the reset transistor 65 across the timing capacitor 29, thus simplifying the construction and operation of the reset circuit 51. The reset circuit 51 is configured to switch on the reset transistor 65 upon detection of an OFF event 508, and it is desirable to achieve the fastest practicable reset of the bypass relay 25 and inrush period timer 23 following the observation of the OFF event 508. In order to identify such an event, the reset transistor 65 is controlled by the low voltage detector 99, connected to the monitoring output 103 to reference the output 502 of the full-wave rectified supply and configured to be sensitive to a cessation in the output of the bridge rectifier 13. The potential at the base of the transistor 57 will vary with the full-wave rectified supply, causing the potential difference between the base and the emitter of the transistor 57 to vary with the output of the bridge rectifier 13. When this output is above a nominal value, for example 0.6V, the transistor 57 is switched on to allow a flow of current between the collector and the emitter, meaning the potential 505*a* at node 74 is set to that of the zero-voltage rail 22. When the potential drops below 0.6 V, the transistor 57 turns off, thus stopping flow of current between its collector and emitter. A current can then flow from the positive rail 20 via node 74 through the reset pulse filter 66 network formed by resistor 63 and capacitor 61. Thus the potential 505*a* at node 74 will have a finite value when the transistor 57 is turned off, which occurs when the output of the bridge rectifier 13 is zero volts—such as when the supply is disconnected at the turn OFF event 508. However, the output of the bridge rectifier 13 will also drop below the nominal value of 0.6 V during steady-state operation in 'zero-crossing' events as illustrated in FIG. 5.1, a characteristic of a full-wave rectified voltage output. By implementing the reset pulse filter 66, as detailed below, the reset circuit 51 is able to distinguish between a drop in voltage caused by an OFF event and one caused by a zero-voltage crossing.

During the period in which the potential 502 is below the nominal value, a current will flow through the filter resistor 63 and begin to charge the filter capacitor 61. The potential 506 across the filter capacitor 61 will begin to increase with a time constant dependent on the capacitance of the filter capacitor 61 and the resistance of the resistor 63. When a nominal value for the potential across the filter capacitor 61 is reached, for example 0.6 V, the reset transistor 65 will activate and short out the timing capacitor 29. The reset transistor 65 will not activate until a sufficient charge has been achieved in the filter capacitor 61, thus unless the reset pulse is of a sufficient duration, being the duration required to charge the filter capacitor 61, the reset transistor 65 will not activate to short out the timing capacitor 29. Thus if the full-wave rectified voltage drops below the nominal value for only a short period of time, the reset transistor 65 does not activate. Consequently, a discharge of the timing capacitor 29 is prevented from being triggered by innocuous events such as a zero-crossing event. In the optional embodiment where the reset pulse filter 66 comprises the diode 67 connected in parallel with the resistor 63, the filter capacitor 61 can rapidly discharge following a switch on of the transistor to ensure that the filter capacitor 61 is fully discharged before the full-wave rectified voltage again drops below the nominal value. Specifically, when the transistor 57 turns on again following a period where the full-wave rectified voltage is below the nominal value, and the filter capacitor 61 has begun to charge, the voltage at node 74 drops to zero and the filter capacitor 61 rapidly discharges through the diode 67 instead of the filter resistor 63.

When the rectified supply is deactivated, however, the potential 505*a* becomes a continuous finite value level 505*b*. The filter capacitor 61 then continues to charge to a level to activate the reset transistor 65. The activation of the reset transistor 65 rapidly discharges the timing capacitor 29. Thus, after a reaction time 512, the circuit is in a state to provide inrush current protection for the second switch ON event 509. The configuration of the reset pulse filter 66 in this embodiment is such that a reaction time 512 following an OFF event is implemented to be as short as possible, but still sufficiently long to prevent zero-voltage crossings from triggering a reset of the inrush period timer. The potential 510 at node 38, as illustrated by FIG. 5.2, is the voltage on the timing capacitor 29 of the inrush period timer 23, and demonstrates the vulnerability of the circuit without the action of the reset circuit 51. The potential 510 decreases as the charge of the inrush period timer 29 decays with the reservoir capacitor, but does not reduce to a level to deactivate the bypass relay 25 before the switch ON event 509. Thus the bypass switch 7 remains active throughout and there is no inrush protection following the switch ON event.

In FIG. 5, the switch ON and switch OFF events are illustrated as being coincident with zero crossing events, but it would be readily understood that such coincidence is not a necessary result of the operation of the timing circuit 10. The switch ON and switch OFF events may occur independent of the voltage input of the supply 2, as illustrated in FIGS. 5A.1, 5A.2 and 5A.3 of FIG. 5A, where FIGS. 5A.1, 5A.2 and 5A.3 are otherwise as described above for FIGS. 5.1, 5.2 and 5.3 respectively. FIG. 5A further clarifies the behaviour of the potential 505*b* after a switch OFF event 508. After the switch OFF event 508, the voltages on timing circuit 10 will track the decaying voltage across the reservoir capacitor 17. The potential 505*b* will remain at a constant value until the potential between rail 20 and rail 22 drops below the value defined by the zener diode 19, after which the potential 505*b* will track the discharging reservoir capacitor 17. This is illustrated by a decrease in the potential 505*b* prior to the switch ON event 509 in FIG. 5A.3.

Figure 6:
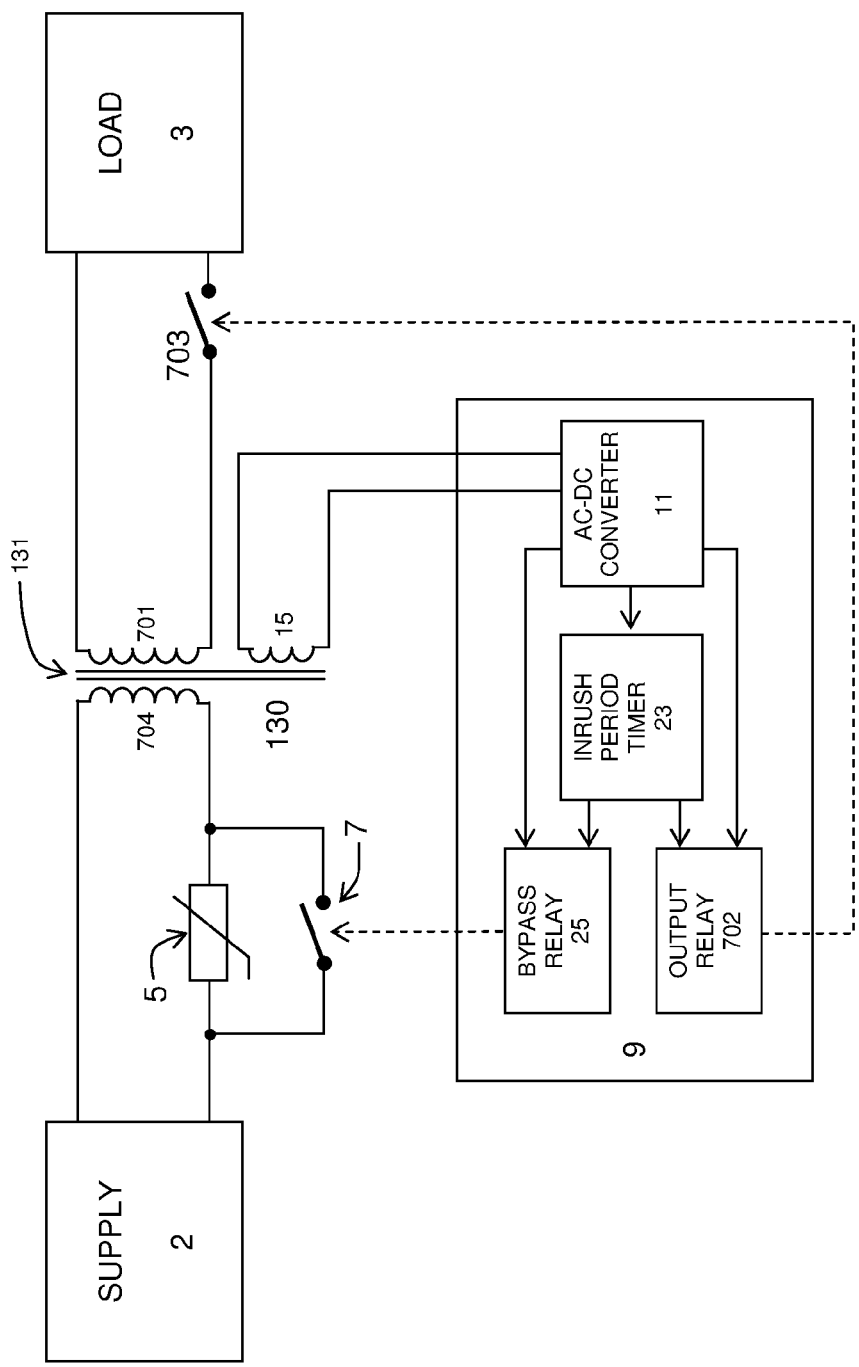
FIG. 6 shows a schematic for a prior art device providing inrush current protection including disconnection of the load by an output control relay.

For safety reasons, it is preferable for an electronic device such as that implemented, for example, in the Olympus WM-NP2 mobile endoscopic workstation to have the load connected to the supply by means of a separation transformer. Such a setup is illustrated by FIG. 6. The supply 2 is connected to the load 3 by means of a separation transformer 130. The separation transformer comprises a core 131 and one or more windings, each winding providing a connection to the transformer. The separation transformer 130 is connected to the supply 2 by means of winding 704, to the load 3 by means of winding 701 and to the timing circuit 9 by means of auxiliary winding 15. This allows for the load to be 'de-referenced' from the protective earth system of the mains supply, which can be advantageous when configuring a system for medical use.

A consequence of using the NTC thermistor 5 to limit the inrush current in the input circuit of the device is that any current flowing in the load 3 must be provided by the supply 2, and will therefore also flow through the NTC thermistor 5, causing it to heat up. Accelerated heating of the NTC thermistor 5 is a potential problem for the system as it causes its resistance to drop, reducing its effectiveness in countering an inrush current resulting from any subsequent OFF-ON event. It is therefore advantageous to disconnect the load 3 from the supply 2 (or divert current from the load 3) and to maintain this disconnection of the load 3 from the supply 2 until the end of the inrush period, upon which the load 3 may be reconnected for steady-state device operation.

Such an operation of the device is provided for in the prior art as set out by FIG. 6, in complementary fashion to the inrush current protection provided as detailed above with respect to FIG. 2. The timing circuit 9 further comprises an output control relay 702, which is communicatively coupled to a switch 703 arranged to disconnect the load 3 from the supply 2. The output control relay 702 is connected to the AC-DC converter 11 and the inrush period timer 23. Prior to a switch ON event of the supply 2, the switch 703 is disconnected. Thus immediately after the switch ON event occurs, current is not provided to the load 3. The inrush period timer 23 is activated by the observation of the switch ON event. After the elapse of the inrush time period, the inrush period timer operates to activate both the bypass relay 25 and the output control relay 702. The bypass switch 7 and switch 703 are activated, and the current is provided by the supply 2 to the load 3 by means of the separation transformer 130. Thus for the entire duration of the inrush period, the NTC thermistor 5 is not required to carry the reflected load current component of the input current, minimising its self-heating.

The configuration of the output control relay 702 to be triggered by the inrush period timer 23 results in a disconnection of the output every time a new inrush period cycle is triggered. In the case of the prior art, where the reset time of the inrush period timer 23 and the bypass relay 25 was long and subsequent disconnections and reconnections of the mains supply did not cause the bypass relay to drop out, the output remained connected throughout. Embodiments of the present invention provide a fast drop-out of the bypass relay 25 and a reset of the inrush period timer 23 at a switch off of the supply 2, even if only momentarily. By implementing an output control relay 702 triggered by the inrush period timer 23, the undesirable result would arise that the output dropout would be unnecessarily lengthened, guaranteeing a reset of the external equipment, even if the drop-out is only a few milli-seconds long. It is preferable that the timing circuit 10 be implemented such that a momentary drop-out initiates a new inrush cycle, but ensures that the output control relay 702 remains activated throughout the momentary dropout. This would protect the load from disconnecting unnecessarily, and provide external equipment the best chance at continuing unaffected. Thus for the initial turn-on of the device, the output is disconnected to limit inrush current through the NTC thermistor 5 during the first inrush period, but for subsequent momentary disconnects the load 3 remains connected.

Figure 7:
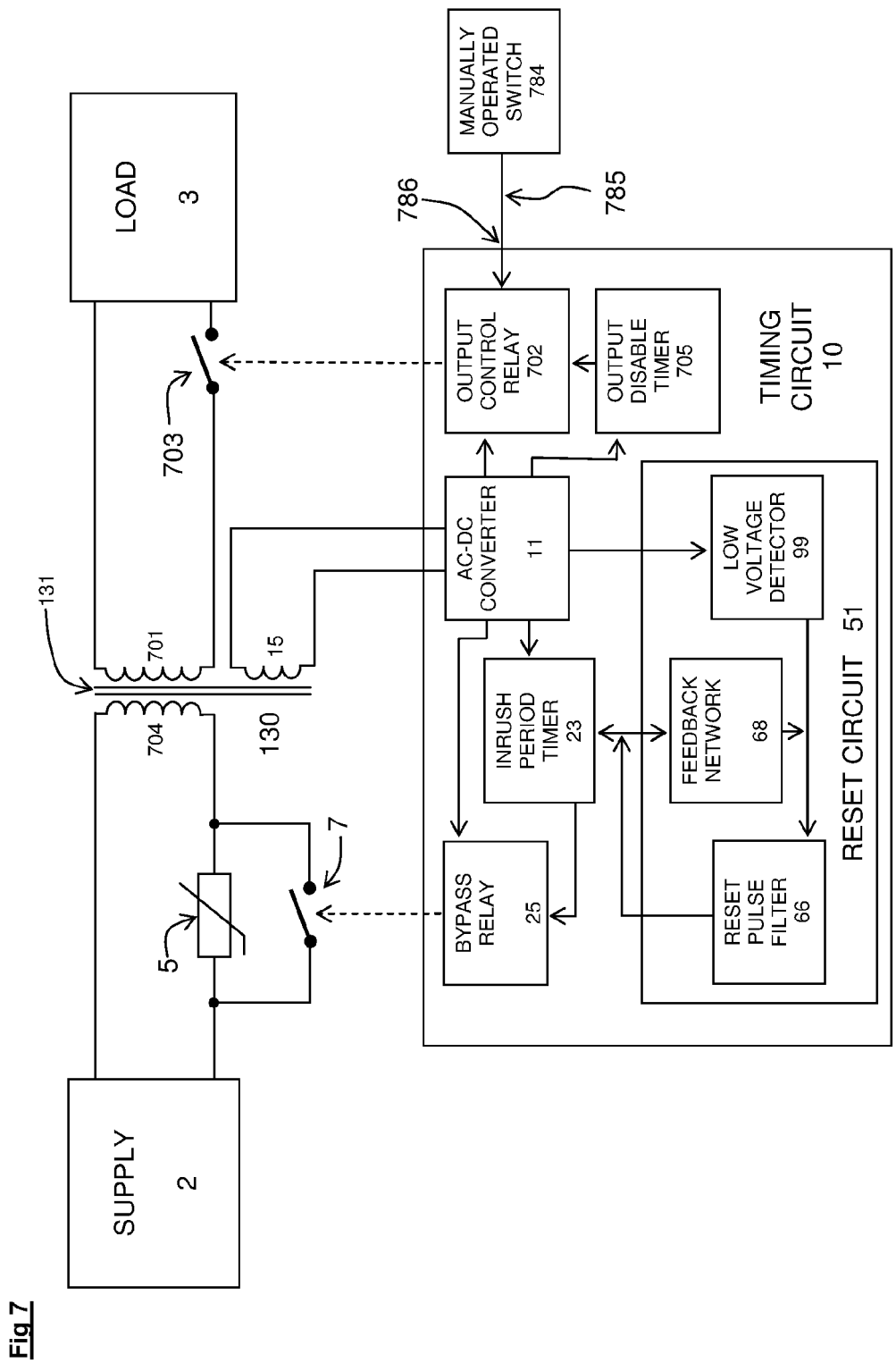
FIG. 7 shows a schematic for an advantageous embodiment of the present invention, being a device for providing inrush current protection including an output control relay and an output disable timer.

FIG. 7 details an embodiment of the present invention, being a device with inrush current protection as detailed above with respect to FIG. 3. The supply 2 is connected to the load 3 by means of the separation transformer 130, where the separation transformer comprises a winding 704 connected to the supply 2 and a winding 701 connected to the load 3. The auxiliary winding 15 provides the AC voltage to the AC-DC converter 11 of the timing circuit 10. In addition to the features of the AC-DC converter 11, the inrush period timer 23, the bypass relay 25 and the reset circuit 51, the timing circuit 10 further comprises an output control relay 702 connected to the AC-DC converter 11, and an output disable timer 705 connected to the output control relay 702 and the AC-DC converter 11.

The AC-DC converter 11, the reset circuit 51, the inrush period timer 23 and the bypass relay 25 operate as detailed above with respect to FIG. 3. The output control relay 702 is configured to disconnect the load 3 from the supply 2 to limit the current flow through the NTC thermistor 5. However, rather than having the output control relay 702 activated by the inrush period timer 23, as detailed above with respect to FIG. 6, the output control relay 702 is instead activated by means of an output disable timer 705, separate from the inrush period timer 23. The output disable timer 705 is arranged to be engaged by a switch ON event of the supply 2, and after a period of operation of the output disable timer 705 (called the output disable period), the output disable timer activates the output control relay 702 to connect the load 3 to the supply 2. The output disable period may be shorter, longer or the same length of time as the inrush time period. As in previously described embodiments, following a switch OFF event, the reset circuit 51 will operate to reset the inrush period timer 23 and disengage the bypass relay 25 in preparation for a new inrush event. This reset will occur even with charge remaining in the AC-DC converter 11. In the present advantageous embodiment, the device is configured such that reset pulses generated by the low voltage detector 99 do not trigger a reset of the output disable timer 705 and consequently reset circuit 51 does not reset the output disable timer 705. Instead, a current from the decaying charge from the AC-DC converter will continue to be provided to the output disable timer 705. Thus the output disable timer 705 and output control relay 702 will remain active for a period of time following a switch OFF event, allowing the load 3 to remain connected to the supply 2 during momentary interruptions. Thus, the output disable timer 705 is not actively reset by a turn off of the supply 2. To this end, the decay time of the AC-DC converter 11 is preferably as long as practicable to enable the external equipment to 'ride out' any momentary interruptions to the power supply, but need not exceed the hold-up time of the power supplies in the connected equipment as eventually they too will drop out due to lack of power since they share the same mains supply as the device described in this embodiment.

Furthermore, in another advantageous embodiment, the output control relay 702 may also be controlled by an external manually-operated switch 784, connected to the device by a cable 785 and connector 786, so enabling the user to manually turn the power to the load 3 on or off as required.

Figure 8:
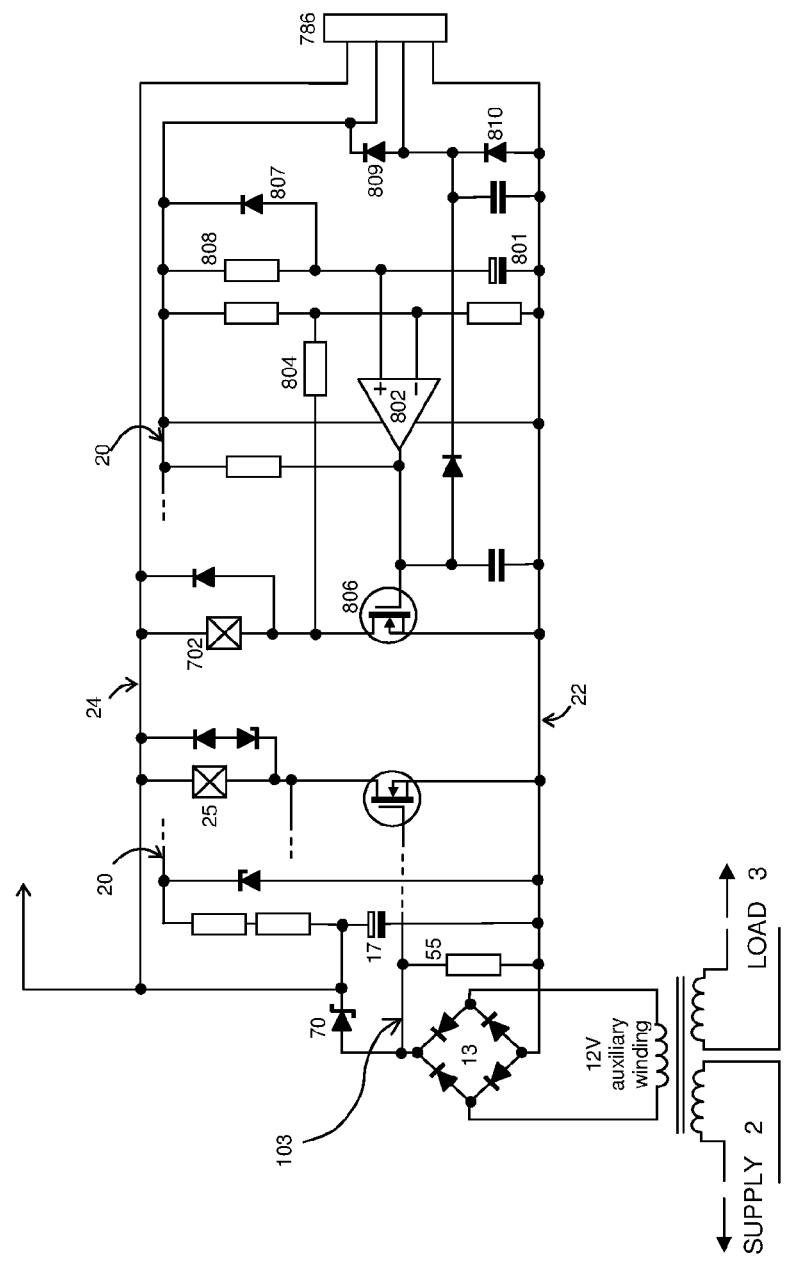
FIG. 8 shows a circuit of an output disable timer, being a feature of an advantageous embodiment of the present invention.

FIG. 8 shows a circuit diagram for the output reset timer 705 of timing circuit 10 shown in FIG. 7. A person skilled in the art would appreciate that the construction and operation of the output disable timer 705 is similar to the operation of the inrush period timer 23; a timing capacitor 801 charges following a switch ON event of the supply, which is referenced by a comparator 802 to engage the output control relay 702. The important distinction between the inrush period timer 23 of FIG. 4 and the output disable timer 705 of FIG. 8 is that the reset circuit 51 is not arranged to discharge the timing capacitor 801. A diode 807 is connected across the series resistor 808 of the timing capacitor, so that the discharge of the timing capacitor 801 tracks the reservoir capacitor 17, eventually causing the output of the comparator 802 to switch, disengaging the relay. In an advantageous embodiment, a hysteresis resistor 804 is connected between the drain of the output MOSFET transistor 806 and the negative reference terminal of the comparator 802, resulting in a higher threshold voltage at the negative reference terminal for the comparator 801 as compared to the inrush period timer 23. Therefore the nominal duration of the output disable timer should be slightly longer than the inrush period timer 23. While FIG. 8 illustrates MOSFET transistors, it is to be understood that the transistors may be NPN bipolar transistors. In this alternative embodiment, the hysteresis resistor 804 is connected between the collector of the output transistor 806 and the negative reference terminal of the comparator 802.

Figure 8A:
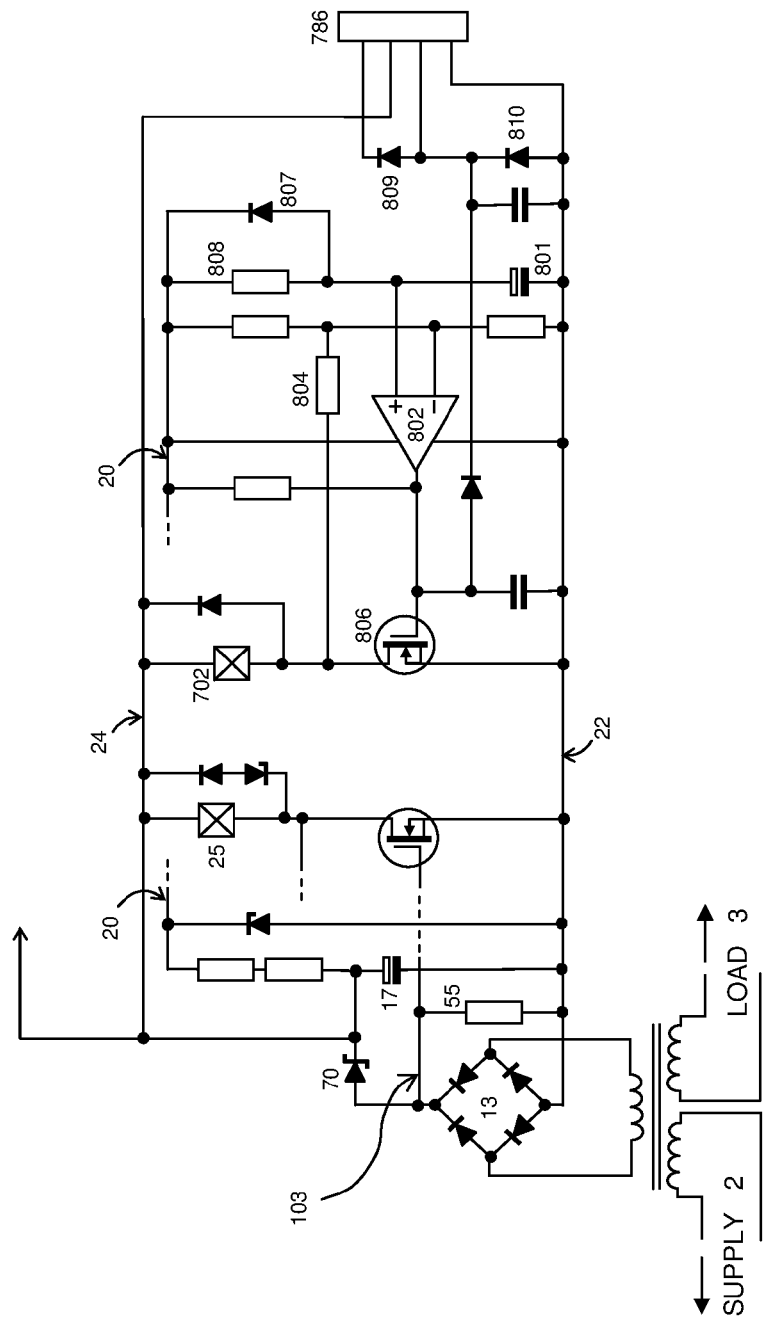
FIG. 8A shows the output disable timer circuit of FIG. 8, with a link between components removed.

FIG. 8 illustrates a connection between the cathode of diode 807 and the cathode of diode 809, but it is to be understood that this is not essential to the operation of the circuit. FIG. 8A illustrates an alternative circuit, where there is no connection between the cathodes of diodes 807 and 809.

It is desirable to maximise reservoir capacitor hold-up time to avoid any unnecessary disconnections of the load 3 due to interruptions to the supply, and this is aided by minimising current consumption in the timing circuit 10. While bipolar transistors are preferable for use in the reset circuit 51 due to their low activation voltage, they are more inefficient than MOSFETs as bipolar transistors require a significant base current to saturate. Preferably, MOSFETs are used for operating the bypass relay 25 and the output control relay 702.

When a heavy load 3 is attached to the output 701 of the separation transformer 130, the load 3 will see a significantly reduced mains voltage due to a voltage drop in the NTC thermistor 5. This can in turn impact on the inrush circuit, since it is powered from the 12 V auxiliary supply, which will also drop significantly and may be momentarily distorted. Because the load 3 will be disconnected following an initial switch ON event, this will not be a problem following this initial switch ON event. However, momentary dips once running, which cause a new inrush cycle following the activation of the reset circuit 51, may result in a double-triggering of new inrush cycles as the DC supply sags and the inrush period timer comparator 31 inputs cross back over.

Figure 9:
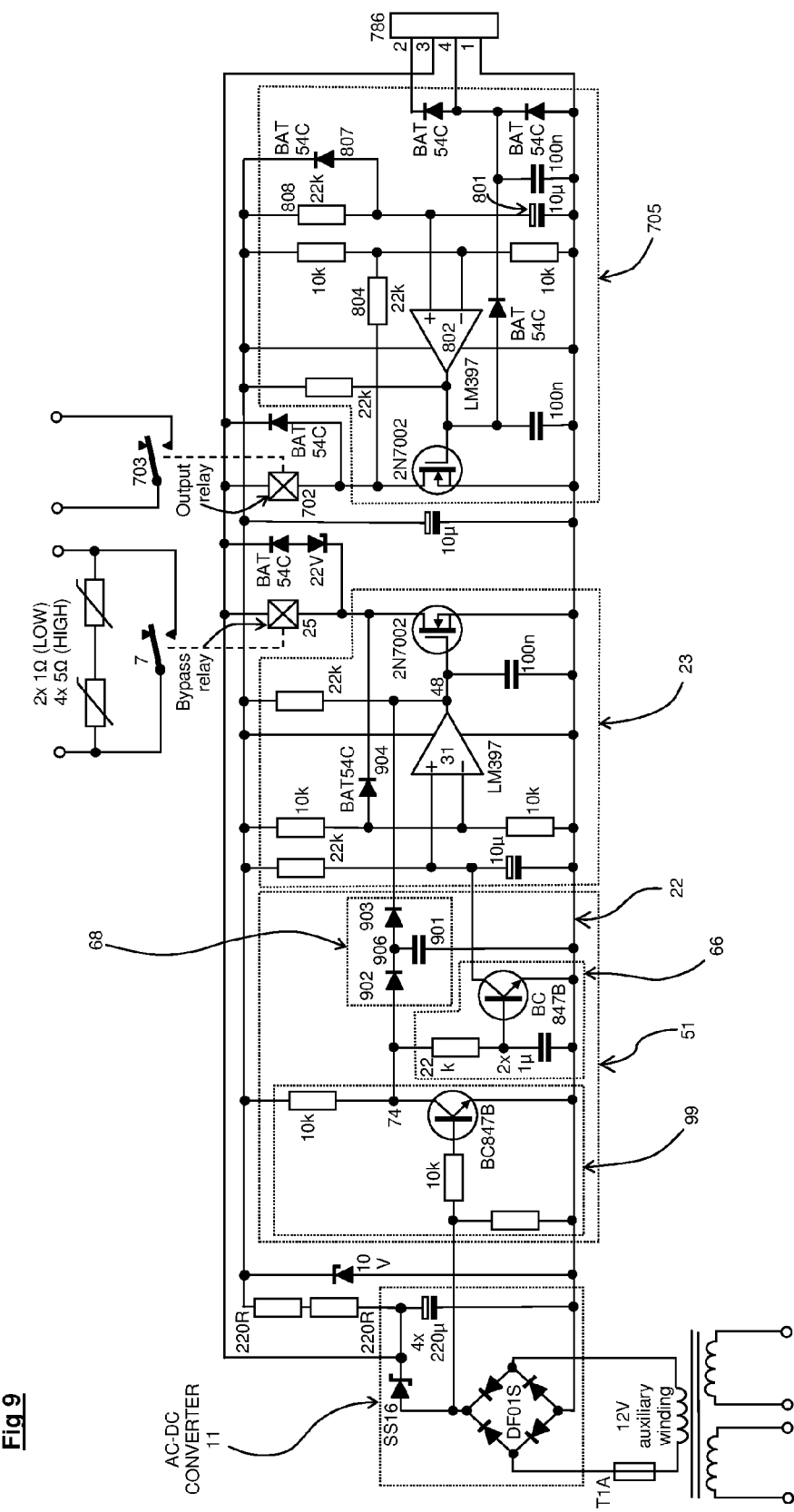
FIG. 9 shows a circuit diagram of an advantageous embodiment of the present invention, the circuit comprising an inrush period timer, a reset circuit and an output disable timer.

Modifications to the timing circuit 10 may be implemented to prevent such double-triggering events. An embodiment of timing circuit 10 is shown in FIG. 9, which comprises the inrush period timer 23, the reset circuit 51 and the output disable timer 705. In addition, the reset circuit 51 also comprises a feedback network 68 and a diode 904, the diode 904 replacing the inrush hysteresis resistor 44 of FIG. 4. The feedback network 68 is connected to node 74 and the zero voltage rail 22, and is connected to the inrush period timer by means of a connection to node 48. The feedback network 68 comprises a diode 902 and diode 903 arranged in series to connect node 74 to node 48, and to permit current to flow between node 74 and node 48. Arranged between diode 902 and diode 903 is node 906. Damping capacitor 901 connects node 906 to the zero-voltage rail 22.

The feedback network 68 operates so as to provide feedback from the comparator 31 of the inrush period timer 23 to the reset pulse filter 66 to operate as a suppressor of reset trigger pulses at the output of the low voltage detector 99. When the output of the comparator 31 is at zero voltage (which occurs during each inrush period and corresponds to the time when the bypass relay is disengaged and the bypass switch 7 is open), current may flow between node 74 and the zero potential rail. Thus the potential of the capacitor 61 of the reset pulse filter is also zero and the capacitor 61 cannot charge to switch on the reset transistor 65. The feedback provided by the feedback network 68 is such that the reset transistor 65 cannot operate during the inrush time period (i.e. the time period during which the bypass switch 7 is open) due to the suppression of the reset pulses. This feature is implemented to stop reset pulses from affecting the reset transistor 65 during the time period between the comparator output being zero and the switch closing and thus prevent a double-triggering of a new inrush period. Bipolar transistors are still preferable for the reset circuit 51, but as they do not need to be high voltage types, virtually any small signal NPN type will suffice; for example, the BC847B transistor.

Figure 9A:
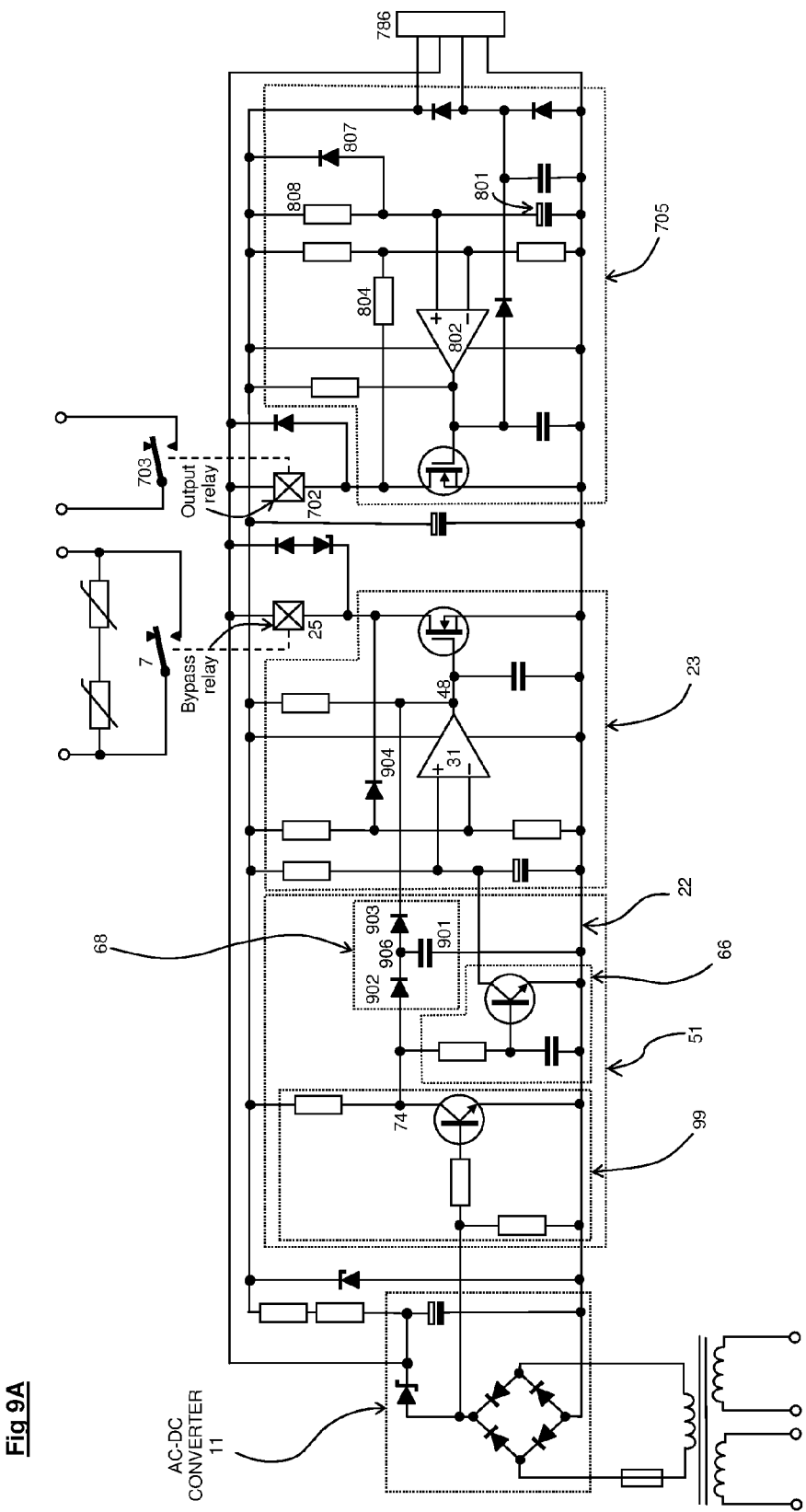
FIG. 9A shows the circuit diagram of FIG. 9, but without particular values for the circuit components.
Figure 9B:
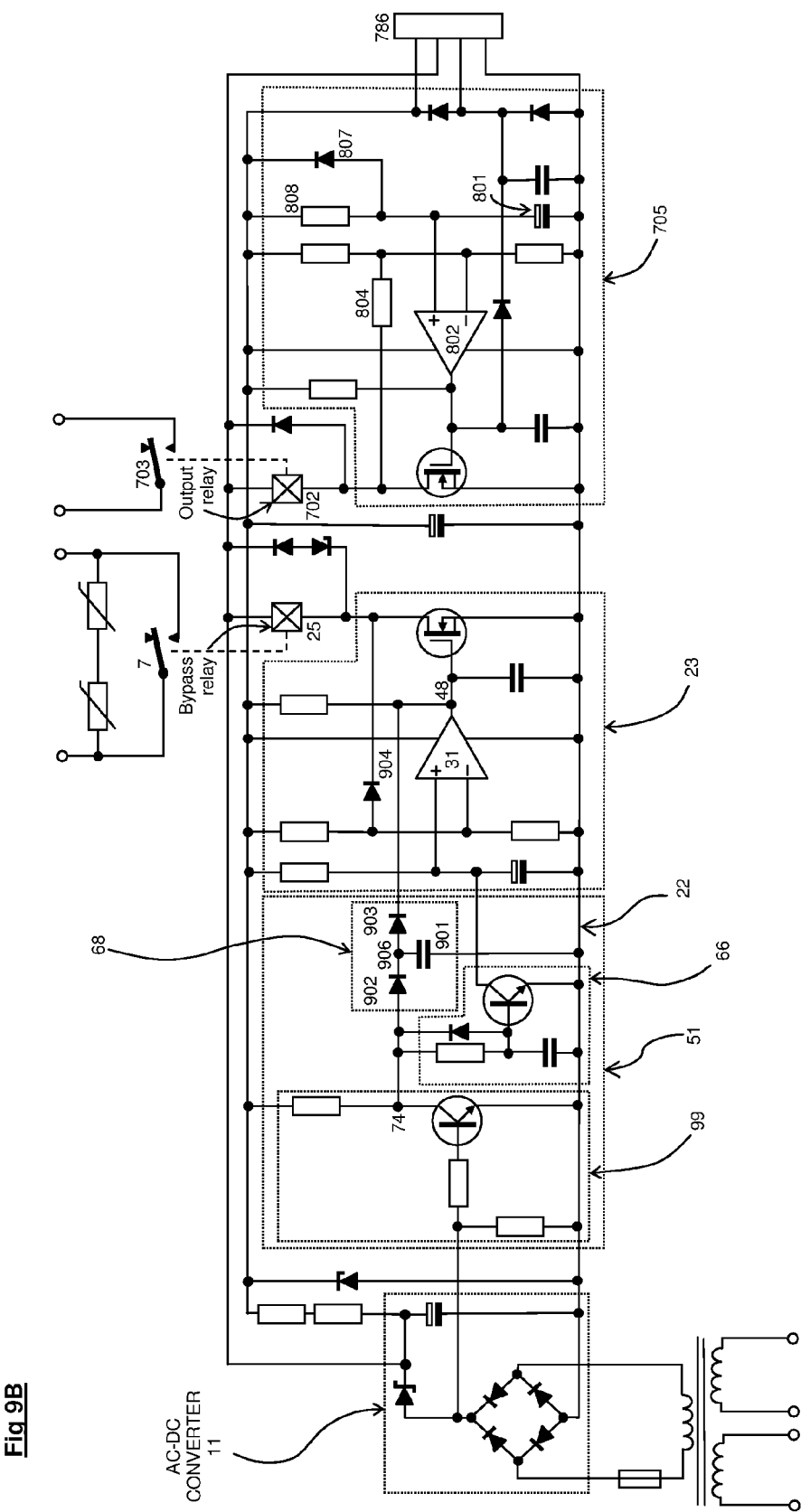
FIG. 9B shows the circuit diagram of FIG. 9 where an additional diode component has been included in accordance with an advantageous embodiment of the present invention.
Figure 9C:
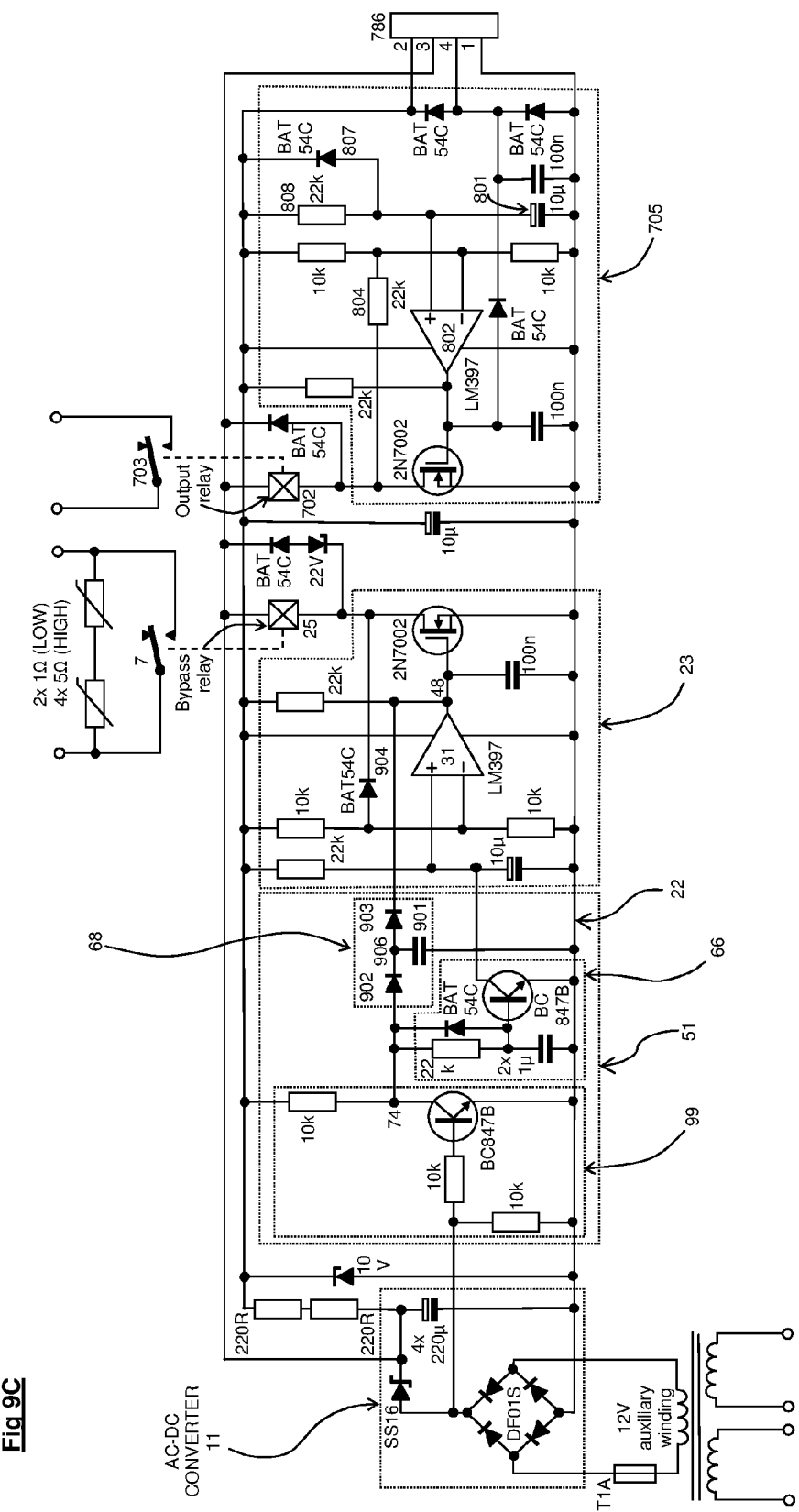
FIG. 9C shows the circuit diagram of FIG. 9A, but with particular values for the circuit components provided.

FIG. 9 illustrates the timing circuit 10 where particular component values have been provided, but it is to be understood that these values are exemplary only. The generalised timing circuit 10 is illustrated in FIG. 9A. FIGS. 9B and 9C illustrate the timing circuit 10 of FIGS. 9 and 9A respectively in the advantageous embodiment where the reset pulse filter 66 comprises a diode, as described above with respect to FIG. 4A.

FIG. 9 illustrates a timing circuit 10 where no connection is provided between the cathode of diode 807 and the cathode of diode 809, in accordance with the embodiment of the output disable timer 705 illustrated in FIG. 8A. FIGS. 9, 9A and 9B each illustrate a timing circuit 10 that includes a connection between the cathode of diode 807 and the cathode of diode 809, in accordance with the embodiment of the output disable timer 705 illustrated in FIG. 8.

Embodiments of the present invention advantageously provide inrush current protection of an electronic device to increase reliability of the device. When considering such requirements, it is instructive to consider section 6.2.7 of EN 60601-1-2, "Medical electrical equipment-Collateral standard: Electromagnetic compatibility". If the unit has a rated output of over 1 kVA, the unit will pass the test requirements provided that it "remains safe, experiences no component failures and is restorable to the pre-test state with operator intervention". While tripping a breaker in a unit could arguably be allowed in the test, in practice this would be a nuisance to the user and should be avoided wherever possible. Embodiments of the present invention can therefore assist compliance with regulatory standards without unnecessary and undesirable tripping of mains protection.

If the inrush period timer was allowed to reset by tracking the charge in the reservoir capacitors, then the full inrush time period may not be available if the power supply is reconnected before the timing capacitor had fully discharged. By actively resetting the inrush period timer upon detection of an OFF event, by means of discharging the timing capacitor upon detection of same, the inrush period timer is configured to provide the full inrush time period for each subsequent ON event. Thus a missing half cycle (such as the one separating the ON event 508 and the OFF event 509 of FIG. 5.1), which would otherwise drive the core of the transformer 130 deep into saturation and result in a large inrush current after switch-on, will be handled successfully with the full period of inrush current protection being provided.

The embodiments detailed above are exemplary only, and it is to be understood that alternative means may be implemented to effect the present invention. The scope of protection sought is to be understood by the reading of the claims that follow.

The invention claimed is:

1. A device for limiting the inrush current component of a current provided by a supply to a load, the device comprising:
   an impedance arranged between the supply and the load;
   a switch arranged to divert the current from the impedance;
   an inrush period timer connected to the supply and arranged to activate the switch after expiry of an inrush time period, the inrush time period being a time period beginning upon the supply becoming active such that current is available to be provided by the supply to the load; and
   a reset circuit connected to the supply and the inrush period timer, the reset circuit arranged to deactivate the switch and reset the inrush period timer in response to the supply becoming inactive such that no current is available to be provided by the supply to the load.

2. The device of claim 1, wherein the reset circuit comprises:
   a low voltage detector to generate a reset pulse at an output upon identification of a voltage below a predefined threshold; and
   a reset pulse filter connected to the output of the low voltage detector, the reset pulse filter arranged to trigger a reset of the inrush period timer when the reset pulse is of a given duration.

3. The device of claim 1, wherein the reset circuit comprises an RC network.

4. The device for limiting inrush current of claim 1, wherein the reset circuit is arranged to deactivate the switch by resetting the inrush period timer.

5. The device for limiting inrush current of claim 2, wherein the reset circuit further comprises a trigger suppressor, wherein the trigger suppressor is connected to the inrush period timer and is arranged to prevent generation of reset pulses until expiration of the inrush time period.

6. The device for limiting inrush current of claim 1, wherein the activation of the switch is derived from the output of a comparator, the comparator arranged to compare a reference value against an output of the inrush period timer.

7. The device for limiting inrush current of claim 6, wherein the inrush period timer is arranged to change the comparator reference value after the switch has been activated.

8. The device for limiting inrush current of claim 1, the device further comprising:
   an output switch arranged to control the current provided to the load; and
   an output disable timer connected to the supply and arranged to activate the output switch after expiry of an output disable period, the output disable period being a time period beginning upon the supply becoming active such that current is available to be provided by the supply to the load.

9. The device of claim 8, wherein the output disable timer is not reset by the reset circuit.

10. The device of claim 8, wherein the device comprises a manually activated switch such that the output switch may be activated or deactivated manually.

11. A method for limiting the inrush current component of a current provided by a supply to a load, the method comprising:
   providing an impedance between the supply and the load to create a resistance against the inrush current;
   starting an inrush period timer in response to the supply becoming active such that current is available to be provided from the supply to the load;
   after expiration of an inrush time period, the inrush time period being a time period following the start of the inrush period timer, activating a switch to divert the current from the impedance; and deactivating the switch and resetting the inrush period timer in response to the supply becoming inactive such that no current is available to be provided by the supply to the load.

12. The method for limiting inrush current of claim 11, further comprising:

using a low voltage detector to generate a reset pulse upon identification of a voltage below a predefined threshold; and using a reset pulse filter to filter out reset pulses of a duration below a minimum reset pulse duration to identify a reset pulse that is able to cause deactivation of the switch in response to the supply becoming inactive.

13. The method for limiting inrush current of claim 11, the method further comprising:

starting an output disable timer to divert current from the load for the approximate duration of the inrush period timer in response to the supply becoming active such that current is available to be supplied to the load.

14. The method for limiting inrush current of claim 13, wherein the output disable timer is not actively reset in response to a turn off of the supply.

15. The method for limiting inrush current of claim 13, the method further comprising setting the duration of the output disable timer based on the inrush time period.

\* \* \* \* \*